US012394908B2

(12) United States Patent
Zhang et al.

(10) Patent No.: US 12,394,908 B2
(45) Date of Patent: Aug. 19, 2025

(54) ANTENNA ASSEMBLY AND ELECTRONIC APPARATUS

(71) Applicant: Huawei Technologies Co., Ltd., Shenzhen (CN)

(72) Inventors: Chen Zhang, Xi'an (CN); Xiaofeng Li, Xi'an (CN); Xing Wang, Shenzhen (CN); Rui Guan, Shenzhen (CN); Zheng Mo, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 18/255,915

(22) PCT Filed: Dec. 2, 2021

(86) PCT No.: PCT/CN2021/135066
§ 371 (c)(1),
(2) Date: Jun. 5, 2023

(87) PCT Pub. No.: WO2022/117034
PCT Pub. Date: Jun. 9, 2022

(65) Prior Publication Data

US 2024/0039163 A1 Feb. 1, 2024

(30) Foreign Application Priority Data

Dec. 4, 2020 (CN) ........................ 202011412536.6

(51) Int. Cl.
*H01Q 9/06* (2006.01)
*H01Q 1/50* (2006.01)
*H01Q 21/24* (2006.01)

(52) U.S. Cl.
CPC ............... *H01Q 9/065* (2013.01); *H01Q 1/50* (2013.01); *H01Q 21/24* (2013.01)

(58) Field of Classification Search
CPC .......... H01Q 9/065; H01Q 1/50; H01Q 21/24; H01Q 1/2291; H01Q 5/371; H01Q 5/40; H01Q 7/00; H01Q 9/285; H01Q 21/26; H01Q 21/30; H01Q 21/0006
See application file for complete search history.

(56) References Cited

U.S. PATENT DOCUMENTS 12,199,364 B2 * 1/2025 Kum ..................... H01Q 21/26
2006/0012535 A1 * 1/2006 McLean ................. H01Q 21/29
343/773
2022/0359994 A1 * 11/2022 Zhang ................. H01Q 25/001

FOREIGN PATENT DOCUMENTS

CN 108172990 A 6/2018
JP 2002151948 A 5/2002

* cited by examiner

*Primary Examiner* — Seung H Lee
(74) *Attorney, Agent, or Firm* — Conley Rose, P.C.

(57) ABSTRACT

An antenna assembly includes a first magnetic dipole antenna and a first electric dipole antenna, where a radiator of the first electric dipole antenna and a radiator of the first magnetic dipole antenna are connected to a first feed point, and the radiator of the first magnetic dipole antenna is perpendicular to the radiator of the first electric dipole antenna. The radiator of the first electric dipole antenna has a second feed point, and on the radiator of the first electric dipole antenna, the first feed point is connected to the second feed point.

20 Claims, 21 Drawing Sheets

ANTENNA ASSEMBLY AND ELECTRONIC APPARATUS

CROSS-REFERENCE TO RELATED APPLICATIONS

This is a National Stage of International Patent Application No. PCT/CN2021/135066 filed on Dec. 2, 2021, which claims priority to Chinese Patent Application No. 202011412536.6 filed on Dec. 4, 2020, both of which are hereby incorporated by reference in their entireties.

TECHNICAL FIELD

This application relates to the field of antenna technologies, and in particular, to an antenna assembly and an electronic apparatus.

BACKGROUND

In a current product, for example, a wireless router, to improve wireless fidelity (wireless fidelity, Wi-Fi) performance, two electric dipole antennas are cross-placed to form a dual-band Wi-Fi antenna, as shown in FIG. 1 to FIG. 3. Horizontal coverage may be ensured by using complementarity. However, to improve antenna isolation, two curves in a corresponding antenna directivity diagram are perpendicular to each other, resulting in a poor degree of imbalance at a plurality of frequency points. The degree of imbalance refers to a maximum difference between two curves corresponding to two dipoles in the antenna directivity diagram, a larger difference indicates a poorer antenna imbalance degree, and a smaller difference indicates a better antenna imbalance degree. In FIG. 2, a difference between a frequency point 1 and a frequency point 2 is 7.7 dB, that is, the two antennas in FIG. 1 have a poor imbalance degree, and the poor imbalance degree causes poor antenna performance, for example, a low throughput rate in some scenarios.

SUMMARY

The technical solutions of this application provide an antenna assembly and an electronic apparatus, to improve an imbalance degree while improving isolation, thereby improving antenna performance.

According to a first aspect, a technical solution of this application provides an antenna assembly, including:

a first magnetic dipole antenna; and a first electric dipole antenna, where a radiator of the first electric dipole antenna and a radiator of the first magnetic dipole antenna are welded to a first feed point, and the radiator of the first magnetic dipole antenna is perpendicular to the radiator of the first electric dipole antenna; and the radiator of the first electric dipole antenna has a second feed point, and on the radiator of the first electric dipole antenna, the first feed point is connected to the second feed point.

In a possible implementation, the first feed point includes a first end and a second end, and the second feed point includes a first end and a second end; and the radiator of the first electric dipole antenna includes a first radiation patch, and the first radiation patch includes:

a first stub, where the first stub has the first end of the first feed point;

a second stub, where the second stub has the second end of the first feed point;

a third stub, where the third stub has the first end of the second feed point;

a fourth stub, where the fourth stub has the second end of the second feed point;

a balun structure, where the balun structure is connected to the second stub, the third stub, and the fourth stub; and a shorted stub, where the first stub is connected to the balun structure by using the shorted stub.

In a possible implementation, the third stub includes a first strip portion and a second strip portion that are perpendicular to each other, one tail end of the first strip portion is the first end of the second feed point, and the other tail end of the first strip portion is connected to a tail end of the second strip portion;

the fourth stub includes a third strip portion, a fourth strip portion, and a fifth strip portion, the third strip portion and the first strip portion are in a same straight line, a tail end, of the third strip portion, that is close to the first strip portion is the second end of the second feed point, a tail end, of the third strip portion, that is away from the first strip portion is connected to a tail end of the fourth strip portion, both the fourth strip portion and the fifth strip portion are perpendicular to the third strip portion, and the third strip portion is perpendicular to the radiator of the first magnetic dipole antenna;

the balun structure includes a sixth strip portion, a seventh strip portion, and an eighth strip portion that are sequentially connected end to end, one tail end of the sixth strip portion is connected to the third strip portion, the other tail end of the sixth strip portion is connected to one tail end of the seventh strip portion, the other tail end of the seventh strip portion is connected to one tail end of the eighth strip portion, the other tail end of the eighth strip portion is connected to the second end of the second feed point, the sixth strip portion and the eighth strip portion are perpendicular to the first strip portion, and the seventh strip portion is parallel to the first strip portion;

the balun structure, the second strip portion, the fourth strip portion, and the fifth strip portion are all on a same side as the first strip portion and the third strip portion;

the fifth strip portion and the balun structure are located between the second strip portion and the fourth strip portion, and the fifth strip portion is located between the fourth strip portion and the balun structure; and a joint between the seventh strip portion and the eighth strip portion is connected to the first stub by using the shorted stub.

In a possible implementation, the first radiation patch further includes a fifth stub located between the eighth strip portion and the second strip portion, and the fifth stub is connected to the eighth strip portion.

In a possible implementation, the radiator of the first electric dipole antenna further includes a second radiation patch parallel to the first radiation patch, and the second radiation patch includes:

a ninth stub, where the ninth stub is opposite to a part of the first stub, and the ninth stub is connected to the first end of the first feed point; and a tenth stub, where the tenth stub is opposite to parts of the sixth strip portion and the third strip portion, and the tenth stub is arranged floating in the air; and a first dielectric layer is arranged between the first radiation patch and the second radiation patch.

In a possible implementation, the radiator of the first magnetic dipole antenna includes a third radiation patch and a fourth radiation patch that are parallel to each other, and a second dielectric layer is arranged between the third radiation patch and the fourth radiation patch; and the third radiation patch is welded to the first end of the first feed point of the first stub, and the fourth radiation patch is welded to the second end of the first feed point of the first stub.

In a possible implementation, the third radiation patch includes a first straight line extension portion, one tail end of the first straight line extension portion is connected to a first arc extension portion, the other tail end of the first straight line extension portion is connected to a second arc extension portion, the first arc extension portion and the second arc extension portion are respectively located on two opposite sides of a center of the first straight line extension portion, and a middle part of the first straight line extension portion is welded to the first end of the first feed point of the first stub:

the fourth radiation patch includes a second straight line extension portion, one tail end of the second straight line extension portion is connected to a third arc extension portion, the other tail end of the second straight line extension portion is connected to a fourth arc extension portion, the third arc extension portion and the fourth arc extension portion are respectively located on two opposite sides of a center of the second straight line extension portion, and a middle part of the second straight line extension portion is welded to the second end of the first feed point of the second stub;

an extension direction of the first straight line extension portion is parallel to an extension direction of the second straight line extension portion; and in a direction perpendicular to a plane on which the third radiation patch is located, an orthographic projection of the first arc extension portion extends from a first point to a second point, an orthographic projection of the third arc extension portion extends from the first point to a third point, the second point and the third point are respectively located on two opposite sides of the first straight line extension portion, an orthographic projection of the second arc extension portion extends from a fourth point to a fifth point, an orthographic projection of the fourth arc extension portion extends from the fourth point to a sixth point, the fifth point and the sixth point are respectively located on the two opposite sides of the first straight line extension portion, and the orthographic projections of the first arc extension portion, the second arc extension portion, the third arc extension portion, and the fourth arc extension portion form at least a part of an edge of a first circle.

In a possible implementation, the antenna assembly further includes: a second electric dipole antenna, where the radiator of the first electric dipole antenna is perpendicular to a radiator of the second electric dipole antenna.

In a possible implementation, the antenna assembly further includes: a second magnetic dipole antenna, where a radiator of the second magnetic dipole antenna is parallel to the radiator of the first magnetic dipole antenna.

In a possible implementation, the radiator of the first magnetic dipole antenna includes a third radiation patch and a fourth radiation patch that are parallel to each other, a second dielectric layer is arranged between the third radiation patch and the fourth radiation patch, and in a direction perpendicular to a plane on which the third radiation patch is located, orthographic projections of edges of the third radiation patch and the fourth radiation patch form at least a part of an edge of a first circle; and the radiator of the second magnetic dipole antenna includes a fifth radiation patch and a sixth radiation patch that are parallel to each other, a third dielectric layer is arranged between the fifth radiation patch and the sixth radiation patch, both the fifth radiation patch and the sixth radiation patch include arc extension portions, in a direction perpendicular to the fifth radiation patch, orthographic projections of the arc extension portions of the fifth radiation patch and the sixth radiation patch form at least a part of an edge of a second circle, and a diameter of the second circle is less than a diameter of the first circle.

In a possible implementation, the radiator of the second magnetic dipole antenna has a third feed point, and the third feed point is located in a middle part of the second circle; and the radiator of the first electric dipole antenna includes a first radiation patch and a second radiation patch parallel to the first radiation patch, a first dielectric layer is arranged between the first radiation patch and the second radiation patch, the second radiation patch includes a welding portion, the welding portion extends from the first feed point to the third feed point, and the second magnetic dipole antenna and the welding portion are welded to the third feed point.

According to a second aspect, a technical solution of this application provides an electronic apparatus, including the foregoing antenna assembly.

According to the antenna assembly and an electronic apparatus in embodiments of this application, the magnetic dipole antenna and the electric dipole antenna are vertically crossed, and radiators of the two antennas are welded at the first feed point in a welding manner, to form a co-ground design. In addition, the first feed point and the second feed point are connected, so that an imbalance degree is improved while isolation is improved, so that antenna performance is improved.

DESCRIPTION OF EMBODIMENTS

Figure 1:
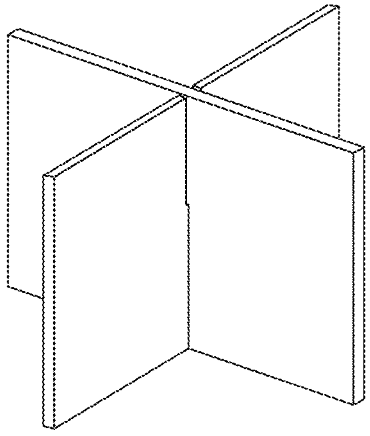
FIG. 1 is a schematic diagram of an antenna structure in the conventional technology.
Figure 2:
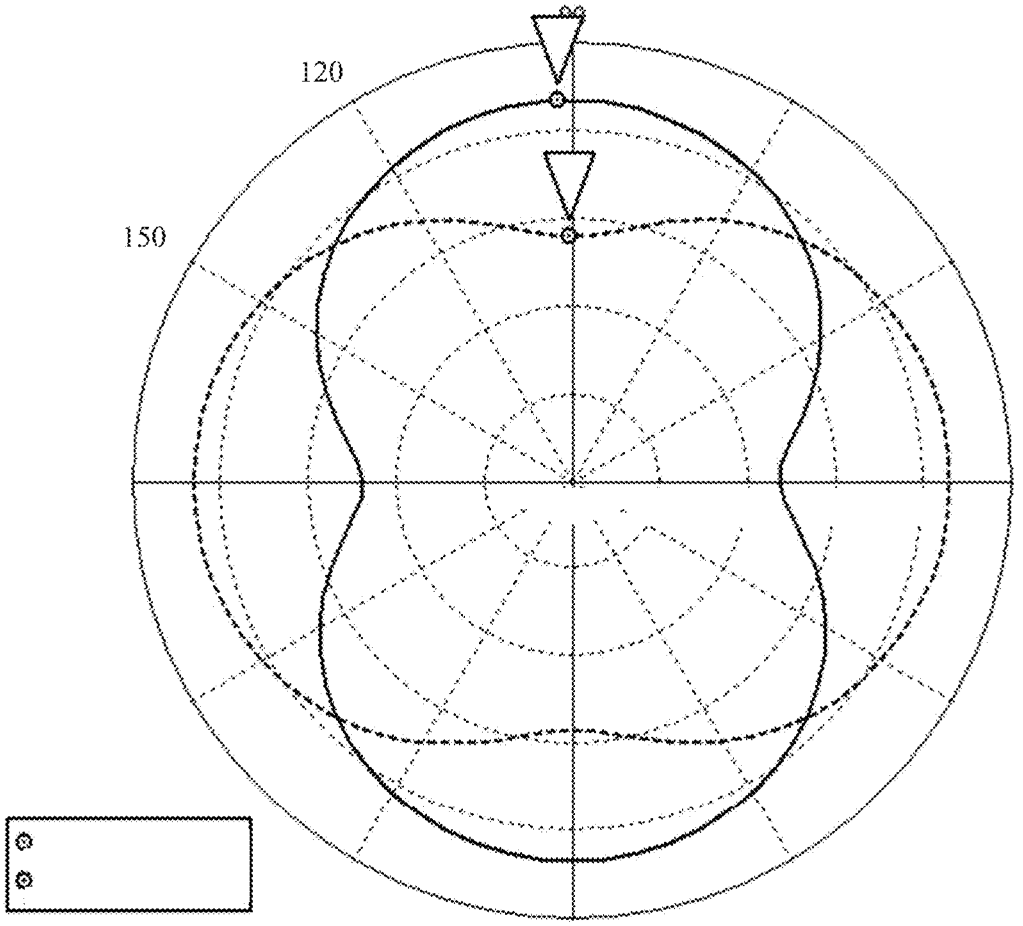
FIG. 2 is a directivity diagram of the antenna structure in FIG. 1 at 2.4 GHz.
Figure 3:
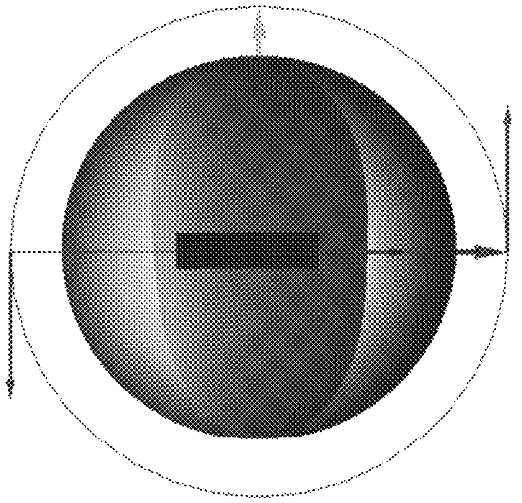
FIG. 3 is a synthetic directivity diagram of the antenna structure in FIG. 2.
Figure 4:
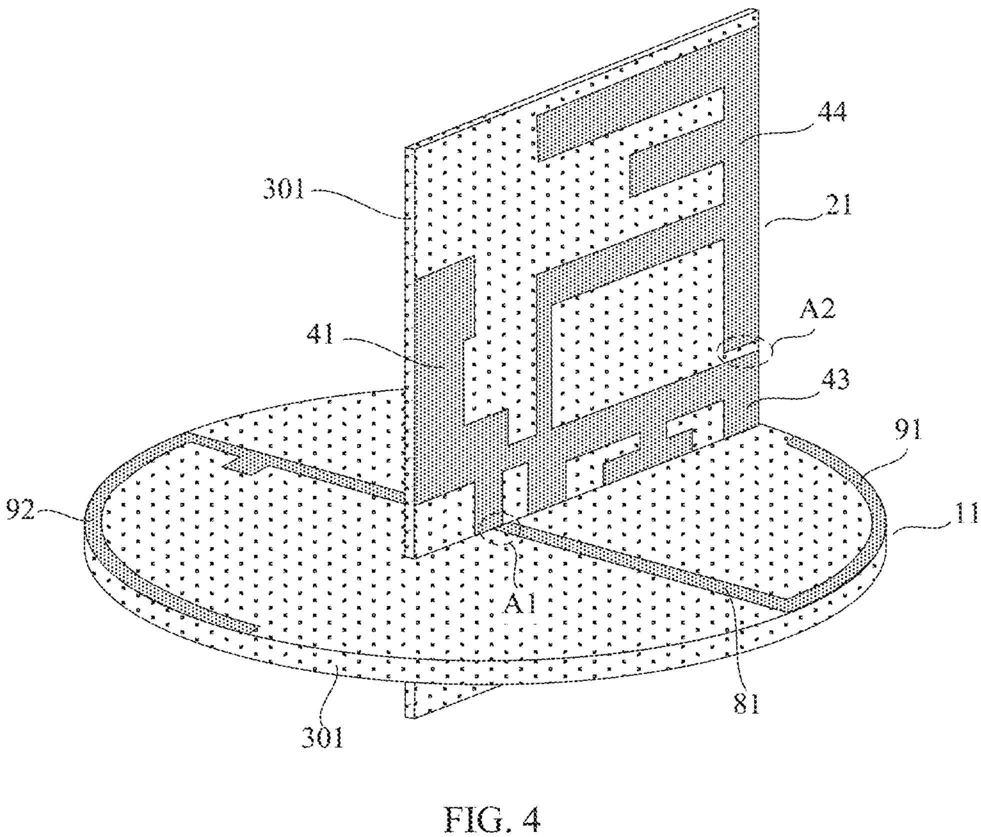
FIG. 4 is a schematic diagram of a structure of an antenna assembly according to an embodiment of this application.
Figure 5:
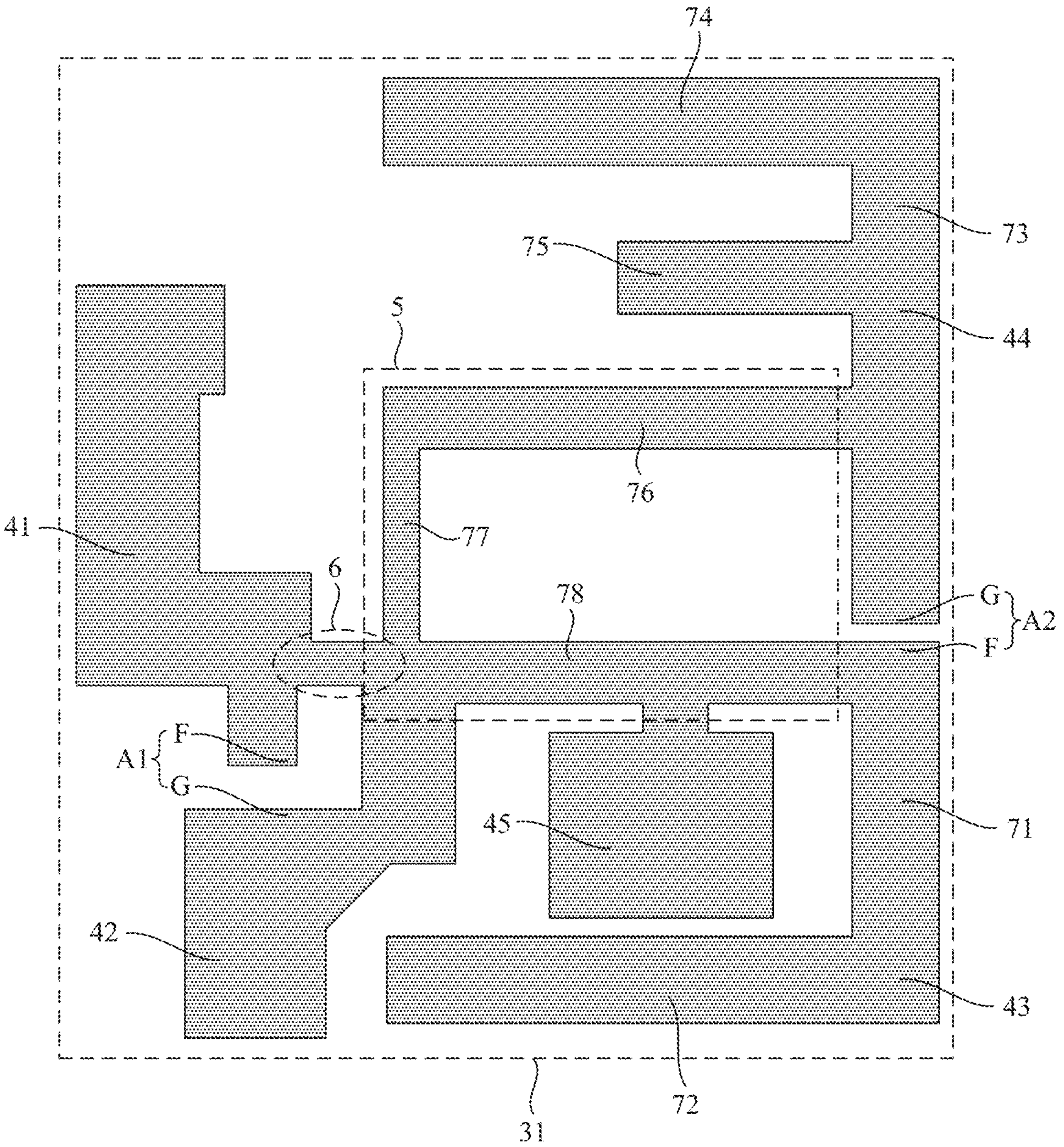
FIG. 5 is a schematic diagram of a structure of a first radiation patch of the antenna assembly in FIG. 4.
Figure 6:
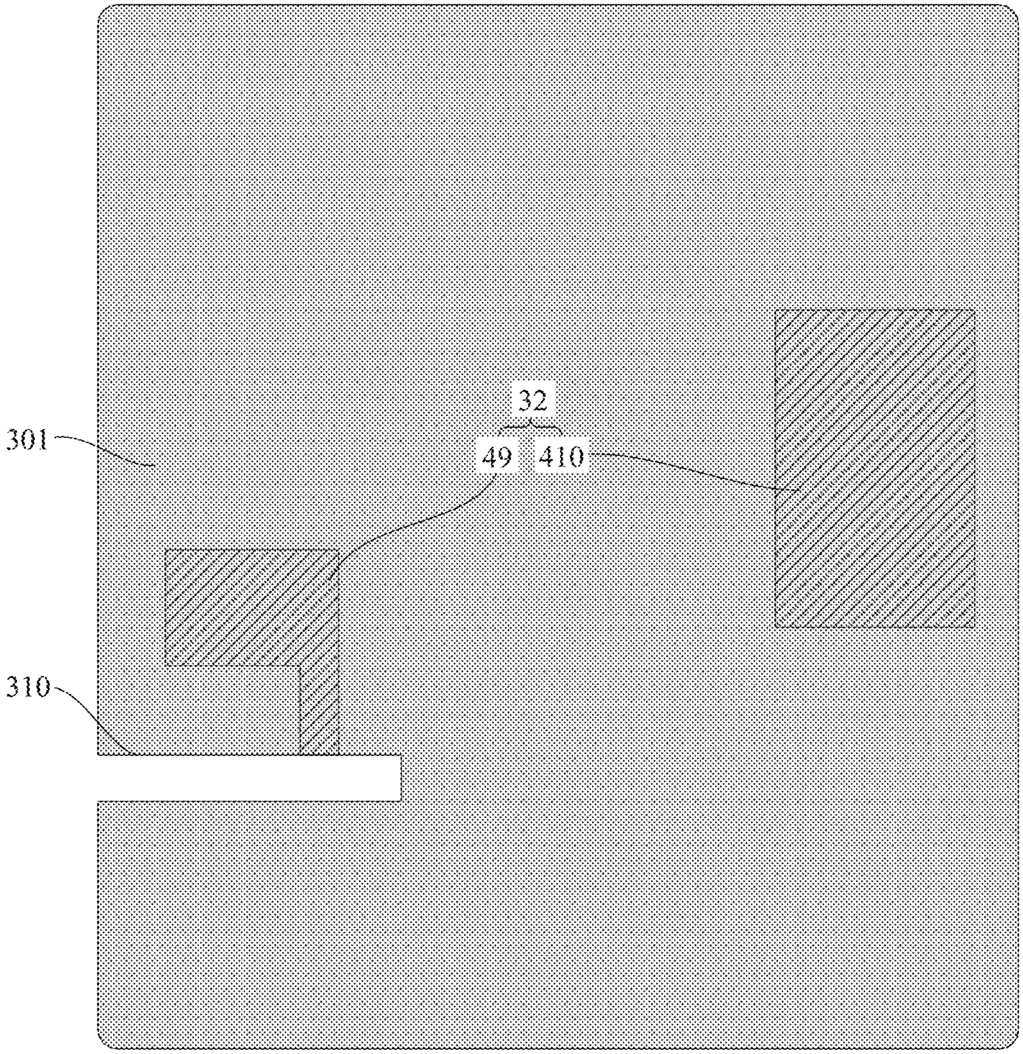
FIG. 6 is a schematic diagram of a structure of a second radiation patch of the antenna assembly in FIG. 4.
Figure 7:
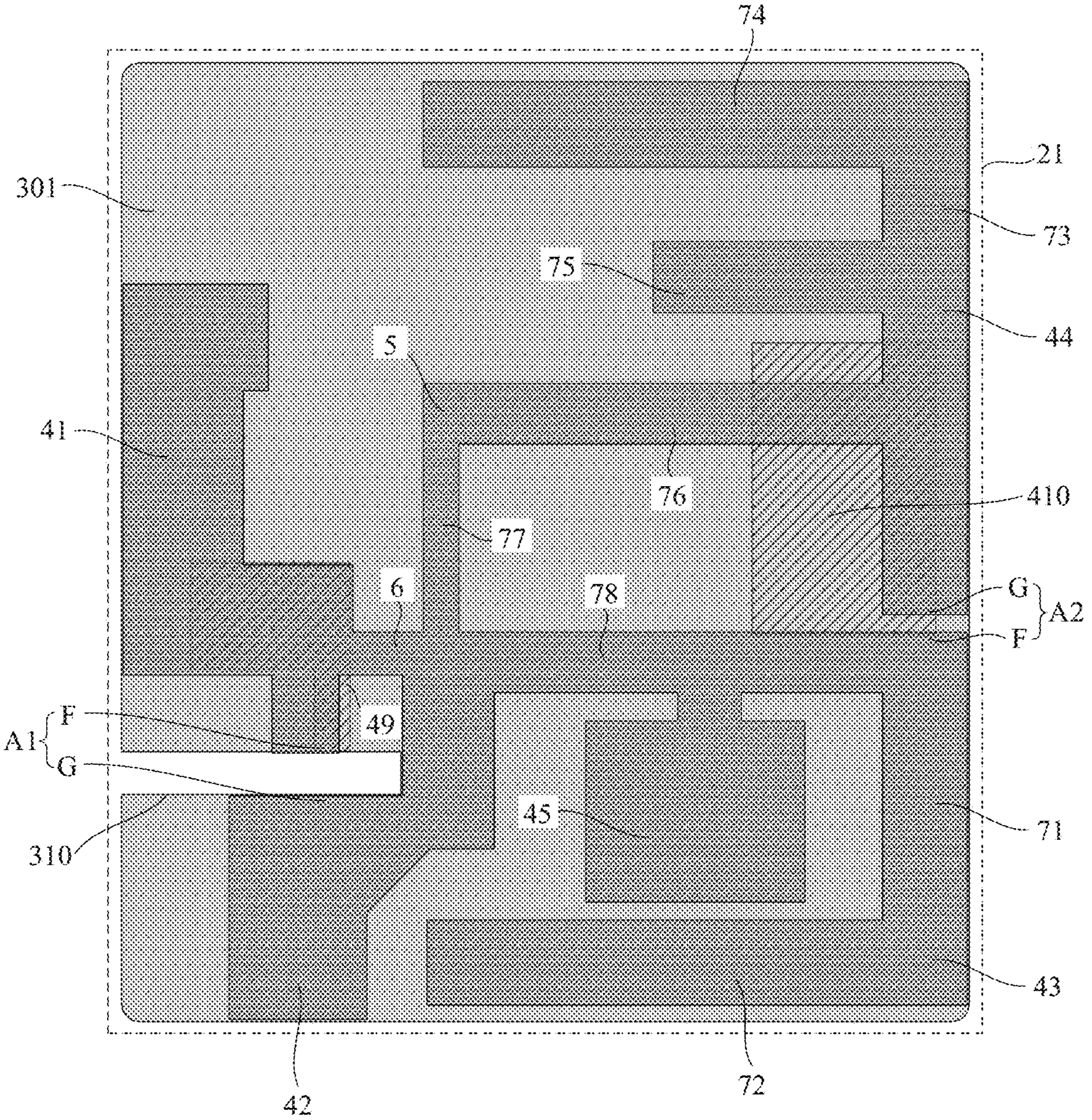
FIG. 7 is a schematic diagram of a structure of a first electric dipole antenna of the antenna assembly in FIG. 4.
Figure 8:
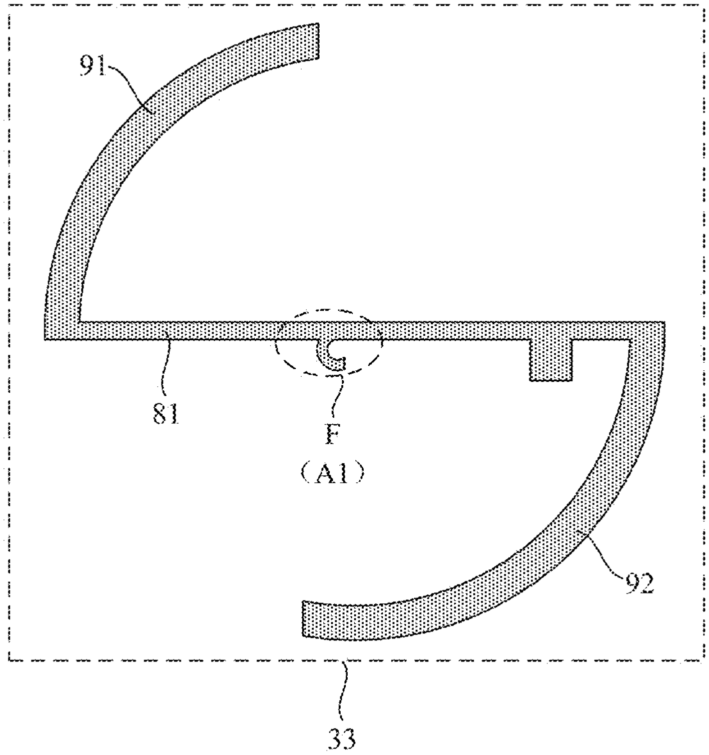
FIG. 8 is a schematic diagram of a structure of a third radiation patch of the antenna assembly in FIG. 4.
Figure 9:
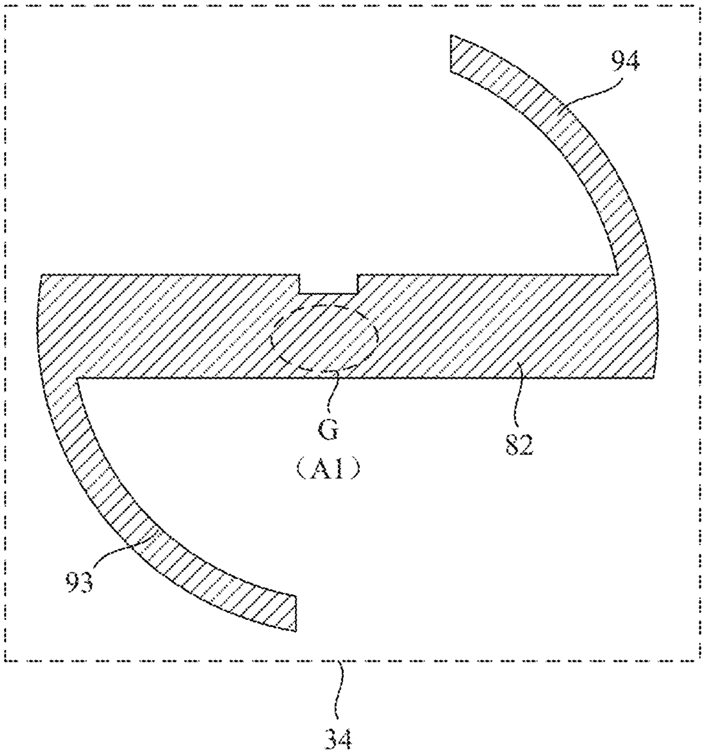
FIG. 9 is a schematic diagram of a structure of a fourth radiation patch of the antenna assembly in FIG. 4.
Figure 10:
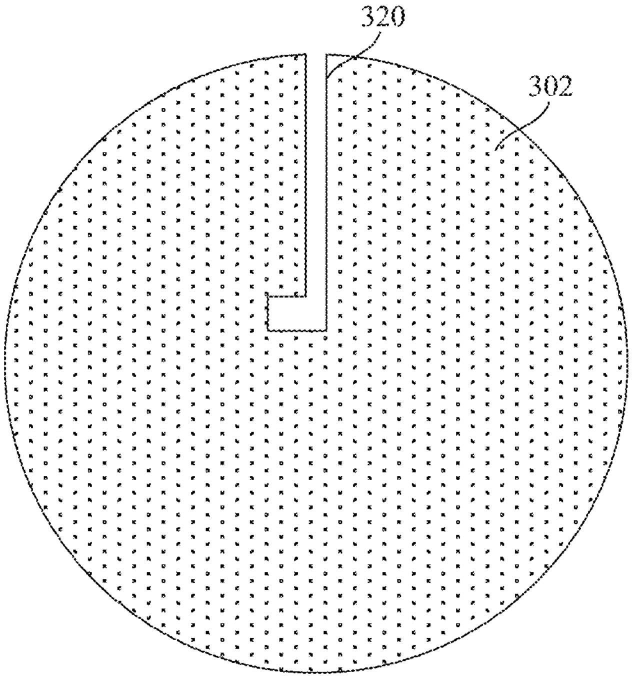
FIG. 10 is a schematic diagram of a structure of a second dielectric layer of the antenna assembly in FIG. 4.
Figure 11:
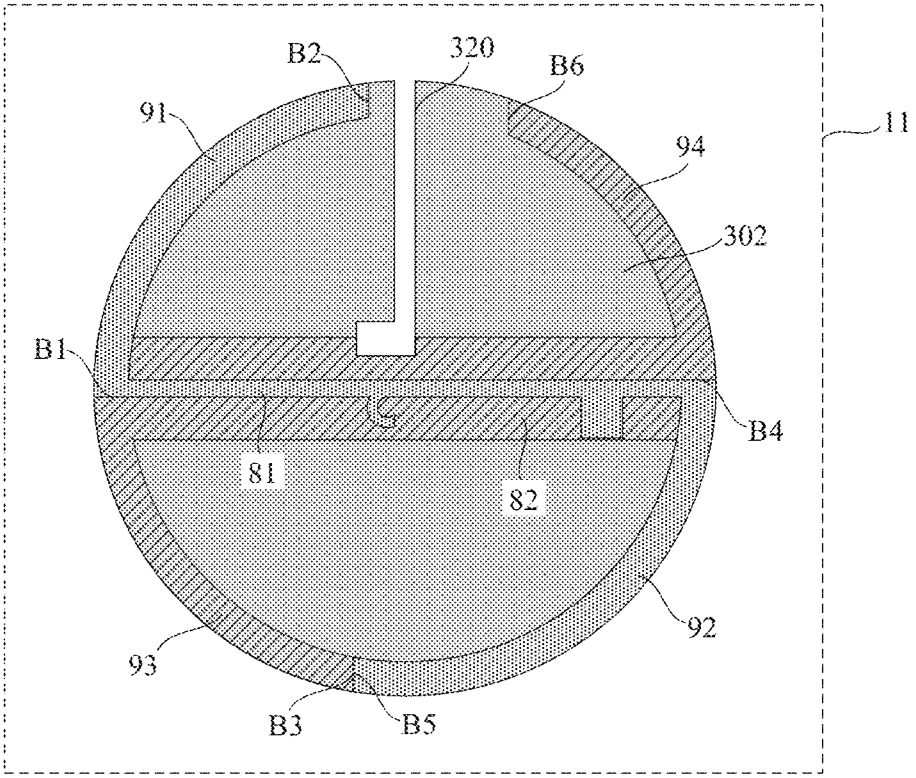
FIG. 11 is a schematic diagram of a structure of a first magnetic dipole antenna of the antenna assembly in FIG. 4.
Figure 12:
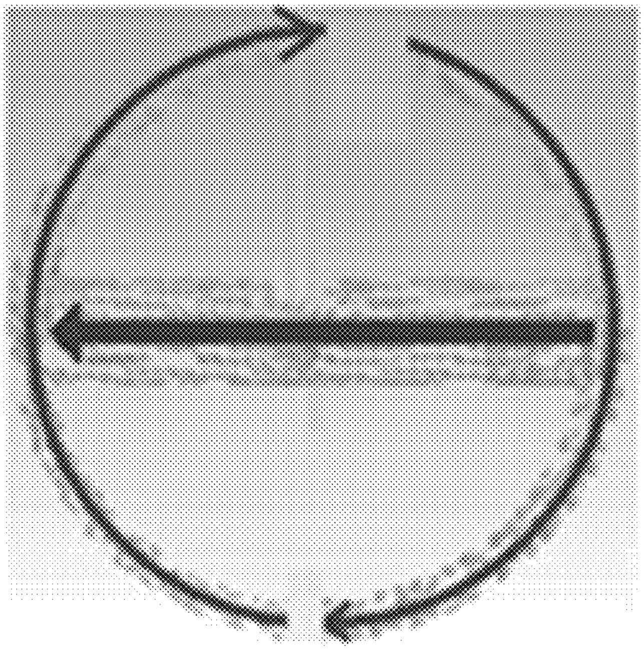
FIG. 12 is a schematic diagram of current simulation of the first magnetic dipole antenna in FIG. 4 to FIG. 11 at 2.45 GHz.

Terms used in embodiments of this application are only used to explain specific embodiments of this application, but are not intended to limit this application.

As shown in FIG. 4 to FIG. 11, an embodiment of this application provides an antenna assembly, including: a first magnetic dipole antenna 11; and a first electric dipole antenna 21, where a radiator of the first electric dipole antenna 21 and a radiator of the first magnetic dipole antenna 11 are welded to a first feed point A1, the radiator of the first magnetic dipole antenna 11 and the radiator of the first electric dipole antenna 21 are radiators in a shape of plate, and the radiator of the first magnetic dipole antenna 11 is perpendicular to the radiator of the first electric dipole antenna 21; and the radiator of the first electric dipole antenna 21 has a second feed point A2, and on the radiator of the first electric dipole antenna 21, the first feed point A1 is connected to the second feed point A2.

Specifically, the first magnetic dipole antenna 11 forms a ring current in a horizontal direction, similar to a magnetic current ring. The radiator of the first magnetic dipole antenna 11 and the radiator of the first electric dipole antenna 21 are integrated in a welding manner. In this way, the radiator of the first magnetic dipole antenna 11 and the radiator of the first electric dipole antenna 21 are fixed and electrically connected, that is, a co-ground design of the two antennas is implemented. The co-ground design may enable the two antennas to have a small clearance, and connect the first feed point A1 to the second feed point A2, thereby ensuring a better balance between the two antennas. In addition, the radiator of the first magnetic dipole antenna 11 is perpendicular to the radiator of the first electric dipole antenna 21, that is, a characteristic that antenna polarizations are perpendicular to each other is utilized, so that antenna performance is improved.

According to the antenna assembly in this embodiment of this application, the magnetic dipole antenna and the electric dipole antenna are vertically crossed, and radiators of the two antennas are welded at the first feed point in a welding manner, to form a co-ground design. In addition, the first feed point and the second feed point are connected, so that an imbalance degree is improved while isolation is improved, so that antenna performance is improved.

In a possible implementation, as shown in FIG. 4 to FIG. 7, the first feed point A1 includes a first end F and a second end G, and the second feed point A2 includes a first end F and a second end G; and the radiator of the first electric dipole antenna 21 includes a first radiation patch 31, and the first radiation patch 31 includes: a first stub 41, where the first stub 41 has the first end F of the first feed point A1; a second stub 42, where the second stub 42 has the second end G of the first feed point A1; a third stub 43, where the third stub 43 has the first end F of the second feed point A2; a fourth stub 44, where the fourth stub 44 has the second end G of the second feed point A2; a balun structure 5, where the balun structure 5 is connected to the second stub 42, the third stub 43, and the fourth stub 44; and a shorted stub 6, where the first stub 41 is connected to the balun structure 5 by using the shorted stub 6.

Specifically, the antenna in this embodiment of this application may be fed by using, for example, a coaxial cable or a transmission line in another form. The transmission line includes a signal cable and a ground cable, the signal cable is connected to one of the first end F and the second end G, and the ground cable is connected to the other of the first end F and the second end G. By using the balun structure 5 and the shorted stub 6, the first feed point A1 and the second feed point A2 may be connected to each other, the first magnetic dipole antenna 11 and the first electric dipole antenna 21 may be grounded together, and antenna directivity coefficients of the two antennas are reduced and antenna isolation is improved. In addition, the single first stub 41 is added to a tail end of the balun structure 5 of the first electric dipole antenna 21, so that horizontal radiation is enhanced. The first stub 41 may be configured to implement radiation of a 5G frequency band, and the shorted stub 6 between the first stub 41 and the balun structure 5 may be configured to ensure that a length of a current path between the first feed point A1 and the second feed point A2 is about ¼ wavelength. In this way, when the first feed point A1 feeds power, a current of the second feed point A2 is small, so that isolation between the two antennas in the 5G part is improved. Based on simulation analysis, an antenna structure in which the shorted stub 6 is not arranged and an antenna structure in which the shorted stub 6 is arranged are compared. After the shorted stub 6 is added, isolation between the two antennas in the 5G part is improved by about 5 dB.

In a possible implementation, as shown in FIG. 4 to FIG. 7, the third stub 43 includes a first strip portion 71 and a second strip portion 72 that are perpendicular to each other, one tail end of the first strip portion 71 is the first end F of the second feed point A2, and the other tail end of the first strip portion 71 is connected to a tail end of the second strip portion 72. The fourth stub 44 includes a third strip portion 73, a fourth strip portion 74, and a fifth strip portion 75, the third strip portion 73 and the first strip portion 71 are in a same straight line, a tail end, of the third strip portion 73, that is close to the first strip portion 71 is the second end G of the second feed point A2, a tail end, of the third strip portion 73, that is away from the first strip portion 71 is connected to a tail end of the fourth strip portion 74, both the fourth strip portion 74 and the fifth strip portion 75 are perpendicular to the third strip portion 73, and the third strip portion 73 is perpendicular to the radiator of the first magnetic dipole antenna 11; and the balun structure 5 includes a sixth strip portion 76, a seventh strip portion 77, and an eighth strip portion 78 that are sequentially connected end to end, one tail end of the sixth strip portion 76 is connected to the third strip portion 73, the other tail end of the sixth strip portion 76 is connected to one tail end of the seventh strip portion 77, the other tail end of the seventh strip portion 77 is connected to one tail end of the eighth strip portion 78, the other tail end of the eighth strip portion 78 is connected to the second end G of the second feed point A2, the sixth strip portion 76 and the eighth strip portion 78 are perpendicular to the first strip portion 71, and the seventh strip portion 77 is parallel to the first strip portion 71; the balun structure 5, the second strip portion 72, the fourth strip portion 74, and the fifth strip portion 75 are all on a same side as the first strip portion 71 and the third strip portion 73; the fifth strip portion 75 and the balun structure 5 are located between the second strip portion 72 and the fourth strip portion 74, and the fifth strip portion 75 is located between the fourth strip portion 74 and the balun structure 5; and a joint between the seventh strip portion 77 and the eighth strip portion 78 is connected to the first stub 41 by using the shorted stub 6.

In a possible implementation, as shown in FIG. 4 to FIG. 7, the first radiation patch 31 further includes a fifth stub 45 located between the eighth strip portion 78 and the second strip portion 72, and the fifth stub 45 is connected to the eighth strip portion 78. The fifth stub 45 is configured to implement capacitive loading to adjust impedance.

In a possible implementation, as shown in FIG. 4 to FIG. 7, the radiator of the first electric dipole antenna 21 further includes a second radiation patch 32 parallel to the first radiation patch 31, and the second radiation patch 32 includes: a ninth stub 49, where the ninth stub 49 is opposite to a part of the first stub 41, and the ninth stub 49 is connected to the first end F of the first feed point A1; a tenth stub 410, where the tenth stub 410 is opposite to parts of the sixth strip portion 76 and the third strip portion 73, and the tenth stub 410 is arranged floating in the air, that is, the tenth stub 410 is not electrically connected to another radiator; and a first dielectric layer 301 is arranged between the first radiation patch 31 and the second radiation patch 32.

Specifically, a first insertion groove 310 may be arranged on the first dielectric layer 301. An extension direction of the first insertion groove 310 may be perpendicular to the first strip portion 71, and the first insertion groove 310 extends inward from an edge of a side, of the first dielectric layer 301, that is away from the first strip portion 71, and extends through the first feed point A to a position close to the second stub 42. The first insertion groove 310 is located between the first end F and the second end G that are of the first feed point A, so that the first magnetic dipole antenna 11 is inserted and respectively welded at the first end F and the second end G that are of the first feed point A.

In a possible implementation, as shown in FIG. 4 and FIG. 8 to FIG. 11, the radiator of the first magnetic dipole antenna 11 includes a third radiation patch 33 and a fourth radiation patch 34 that are parallel to each other, and a second dielectric layer 320 is arranged between the third radiation patch 33 and the fourth radiation patch 34. The third radiation patch 33 is welded to the first end F of the first feed point A1 of the first stub 41, and the fourth radiation patch 34 is welded to the second end G of the first feed point A1 of the first stub 41.

In a possible implementation, as shown in FIG. 4 and FIG. 8 to FIG. 11, the third radiation patch 33 includes a first straight line extension portion 81, one tail end of the first straight line extension portion 81 is connected to a first arc extension portion 91, the other tail end of the first straight line extension portion 81 is connected to a second arc extension portion 92, the first arc extension portion 91 and the second arc extension portion 92 are respectively located on two opposite sides of a center of the first straight line extension portion 81, and a middle part of the first straight line extension portion 81 is welded to the first end F of the first feed point A1 of the first stub 41, in addition, the ninth stub 49 may be welded to the middle part of the first straight line extension portion 81, so that the ninth stub 49 is connected to the first end F of the first feed point A1 by using the first straight line extension portion 81; the fourth radiation patch 34 includes a second straight line extension portion 82, one tail end of the second straight line extension portion 82 is connected to a third arc extension portion 93, the other tail end of the second straight line extension portion 82 is connected to a fourth arc extension portion 94, the third arc extension portion 93 and the fourth arc extension portion 94 are respectively located on two opposite sides of a center of the second straight line extension portion 82, and a middle part of the second straight line extension portion 82 is welded to the second end G of the first feed point A1 of the second stub 42; an extension direction of the first straight line extension portion 81 is parallel to an extension direction of the second straight line extension portion 82; and in a direction perpendicular to a plane on which the third radiation patch 33 is located, an orthographic projection of the first arc extension portion 91 extends from a first point B1 to a second point B2, an orthographic projection of the third arc extension portion 93 extends from the first point B1 to a third point B3, the second point B2 and the third point B3 are respectively located on two opposite sides of the first straight line extension portion 81, an orthographic projection of the second arc extension portion 92 extends from a fourth point B4 to a fifth point B5, an orthographic projection of the fourth arc extension portion 94 extends from the fourth point B4 to a sixth point B6, the fifth point B5 and the sixth point B6 are respectively located on the two opposite sides of the first straight line extension portion 81, and the orthographic projections of the first arc extension portion 91, the second arc extension portion 92, the third arc extension portion 93, and the fourth arc extension portion 94 form at least a part of an edge of a first circle.

Specifically, the third point B3 and the fifth point B5 may overlap, or may be spaced by a distance of one end, and the extension direction of the first straight line extension portion 81 may be perpendicular to the first strip portion 71. A second insertion groove 320 may be arranged on the second dielectric layer 302, and an extension direction of the second insertion groove 320 may be perpendicular to the extension direction of the first straight line extension portion 81. The second insertion groove 320 extends inward from an edge of the second dielectric layer 302 to the middle part of the first straight line extension portion 81 and the second straight line extension portion 82. The first magnetic dipole antenna 11 and the first electric dipole antenna 21 may be inserted into each other through the first insertion groove 310 and the second insertion groove 320. After insertion, the first end F of the first feed point A1 of the first stub 41 of the first electric dipole antenna 21 is adjacent to the middle part of the first straight line extension portion 81 of the first magnetic dipole antenna 11, so that the two are welded together. After the insertion, the second end G of the first feed point A1 of the second stub 42 of the first electric dipole antenna 21 is adjacent to the middle part of the second straight line extension portion 82 of the first magnetic dipole antenna 11, so that the two are welded together.

Figure 13:
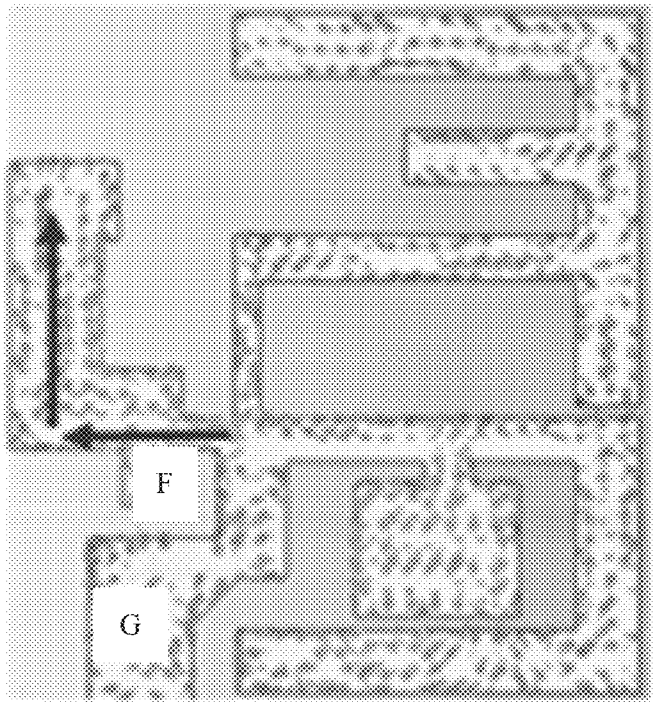
FIG. 13 is a schematic diagram of current simulation of the first electric dipole antenna in FIG. 4 to FIG. 11 at 5 GHz.
Figure 14:
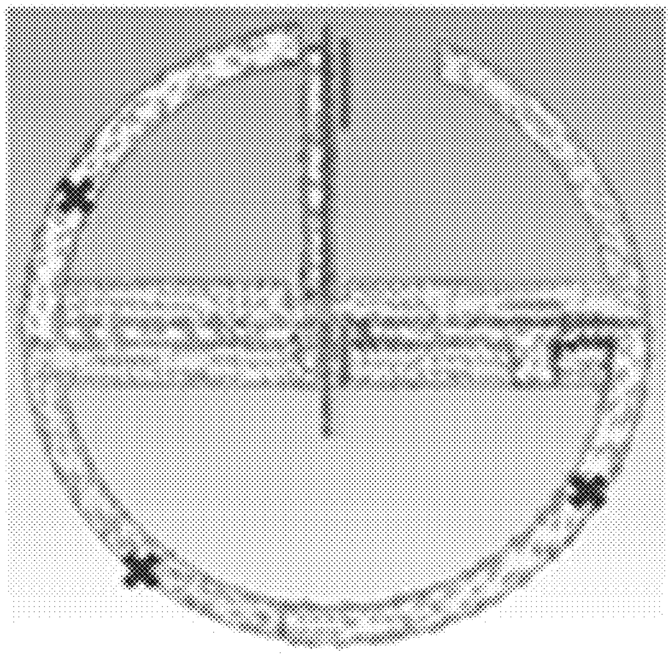
FIG. 14 is a schematic diagram of current simulation of the first magnetic dipole antenna in FIG. 4 to FIG. 11 at 5.6 GHz.
Figure 15:
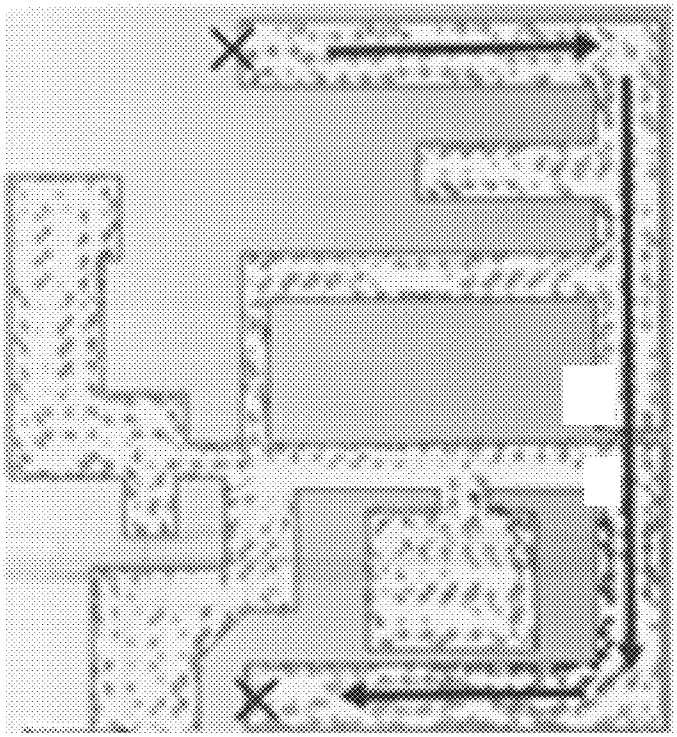
FIG. 15 is a schematic diagram of current simulation of the first electric dipole antenna in FIG. 4 to FIG. 11 at 2.45 GHz.
Figure 16:
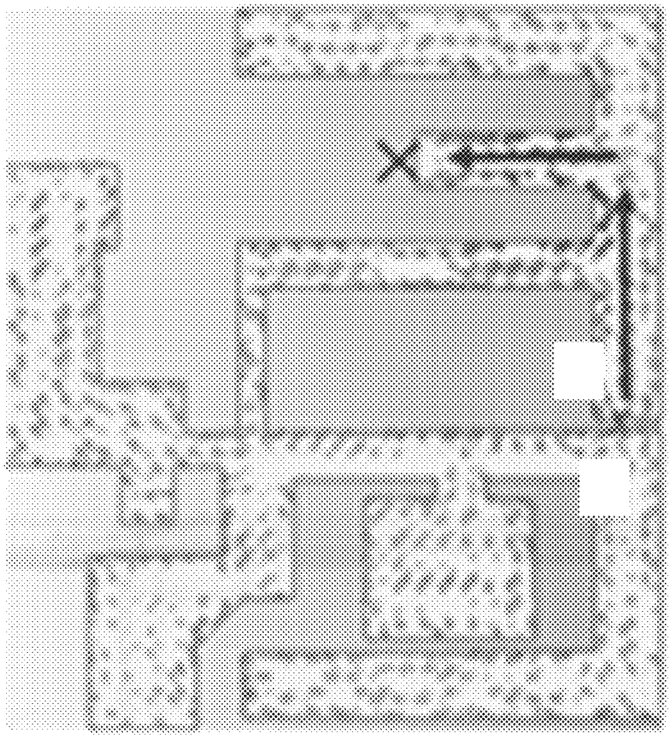
FIG. 16 is a schematic diagram of current simulation of the first electric dipole antenna in FIG. 4 to FIG. 11 at 5.5 GHz.
Figure 17:
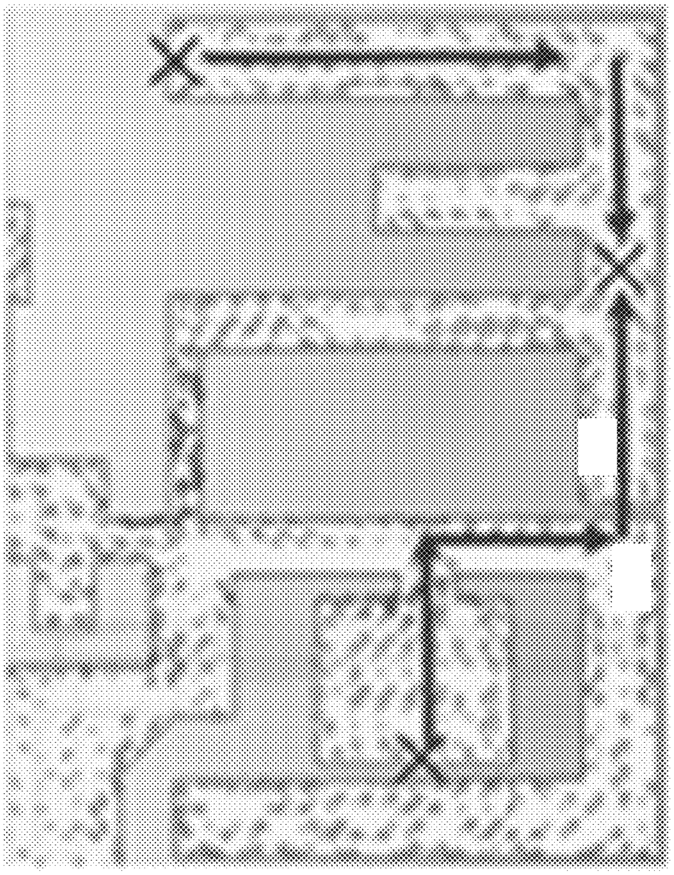
FIG. 17 is a schematic diagram of current simulation of the first electric dipole antenna in FIG. 4 to FIG. 11 at 6 GHz.
Figure 18:
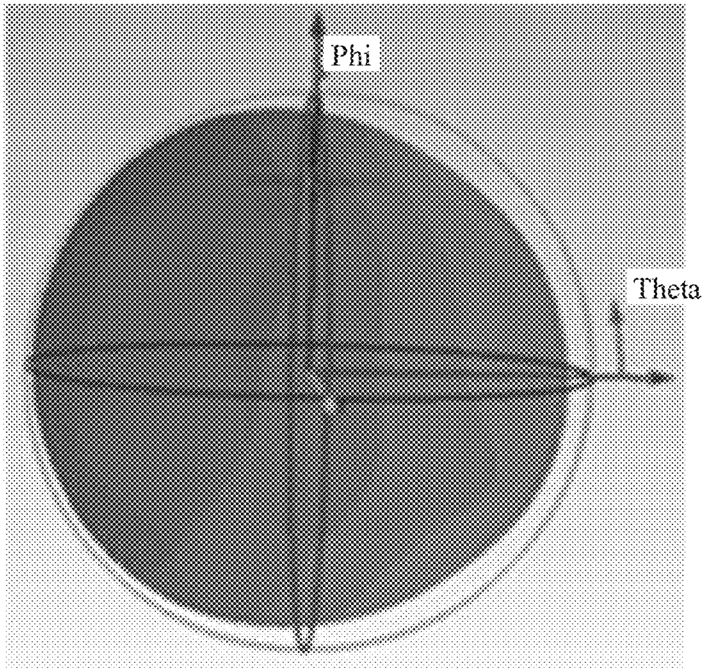
FIG. 18 is a directivity diagram of a first magnetic dipole in FIG. 4 to FIG. 11 at 2.45 GHz.
Figure 19:
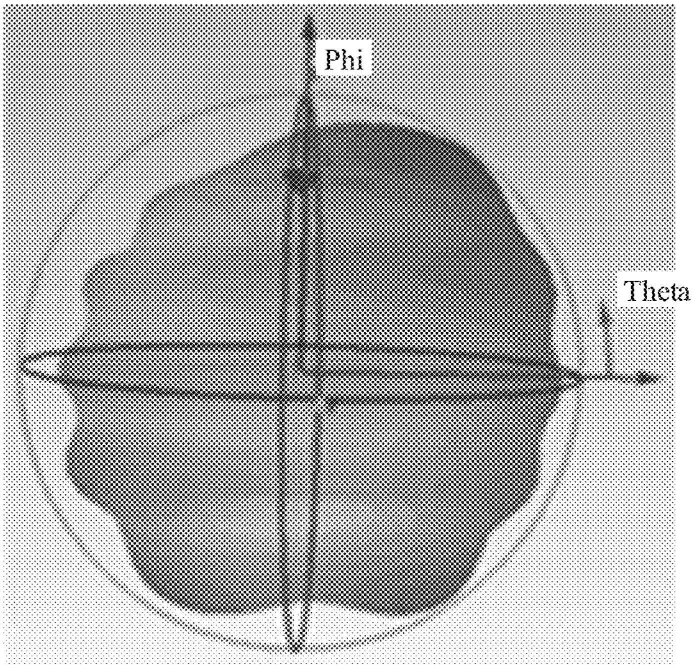
FIG. 19 is a directivity diagram of a first magnetic dipole in FIG. 4 to FIG. 11 at 5 GHz.
Figure 20:
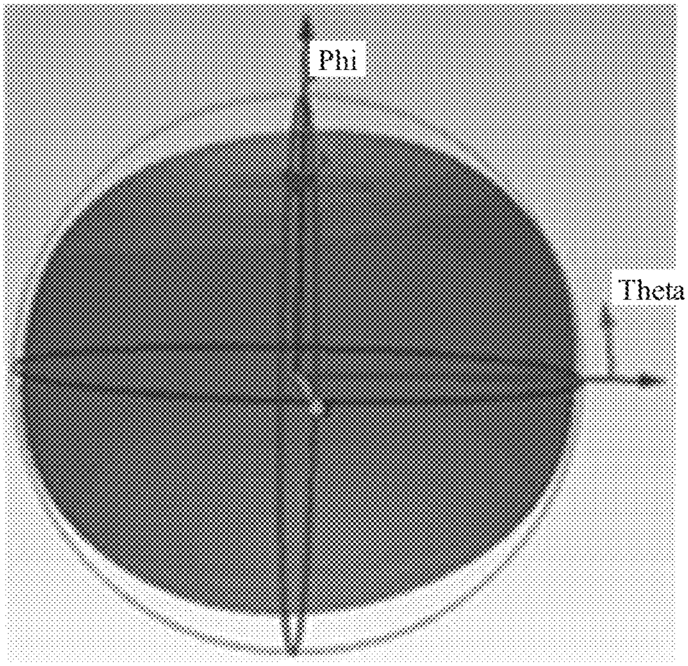
FIG. 20 is a directivity diagram of a first electric dipole in FIG. 4 to FIG. 11 at 2.45 GHz.
Figure 21:
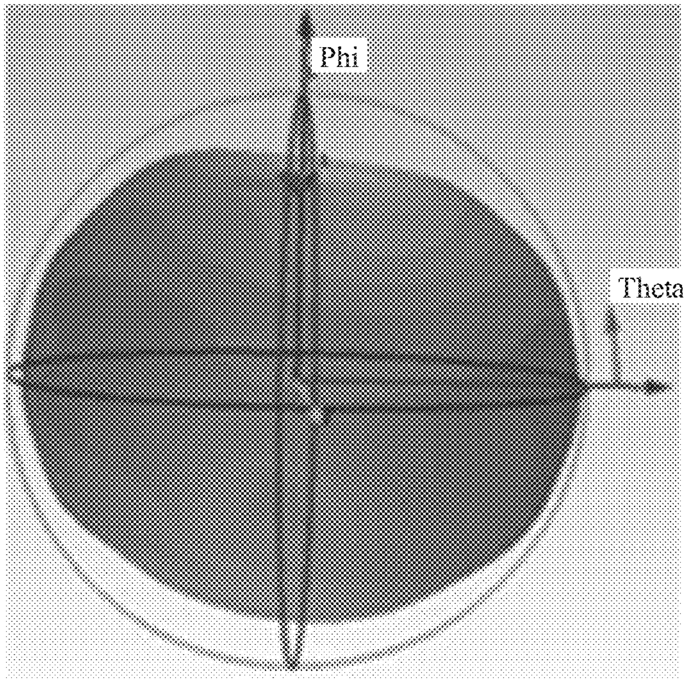
FIG. 21 is a directivity diagram of a first electric dipole in FIG. 4 to FIG. 11 at 5 GHz.
Figure 22:
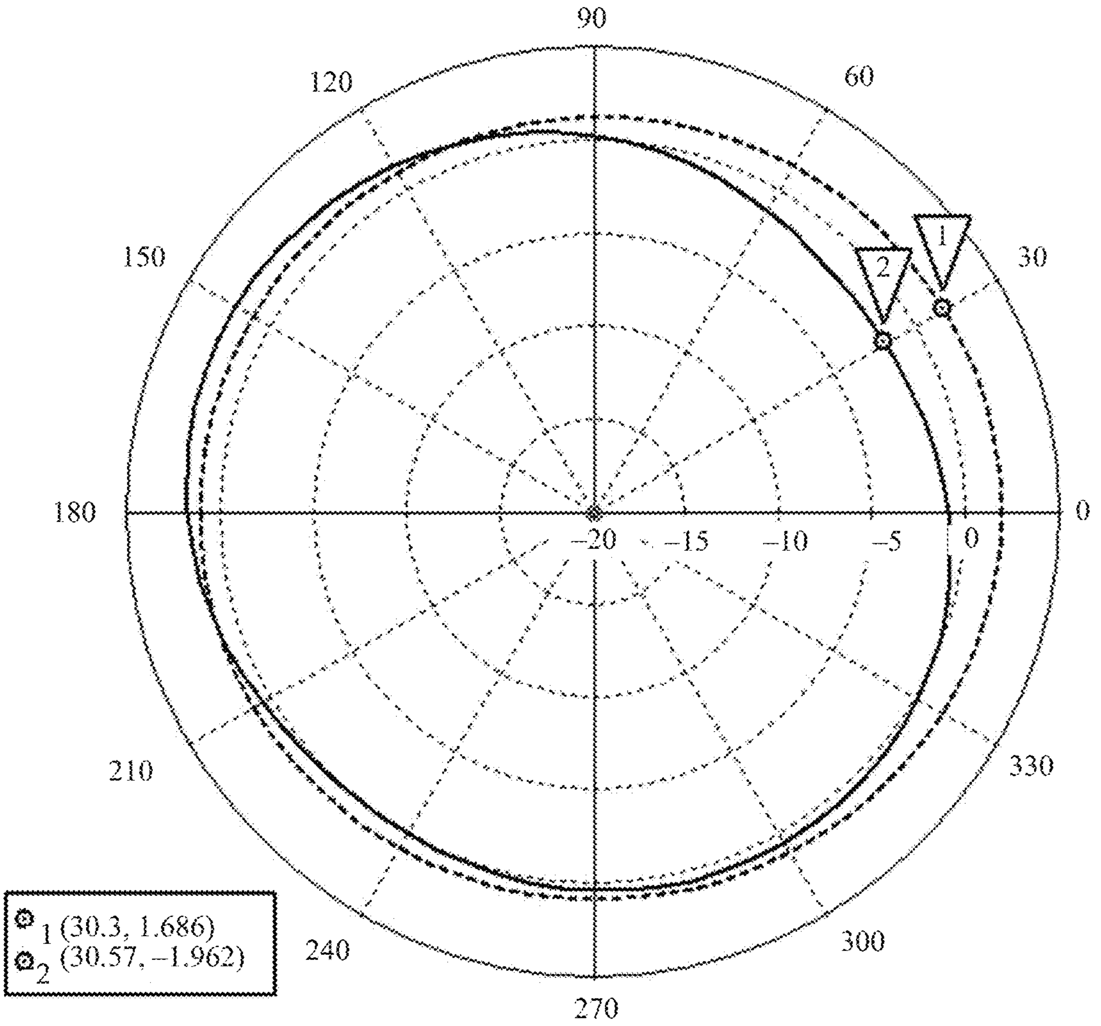
FIG. 22 is a combined directivity diagram of the antenna assembly in FIG. 4 to FIG. 11 at 2.4 GHz.
Figure 23:
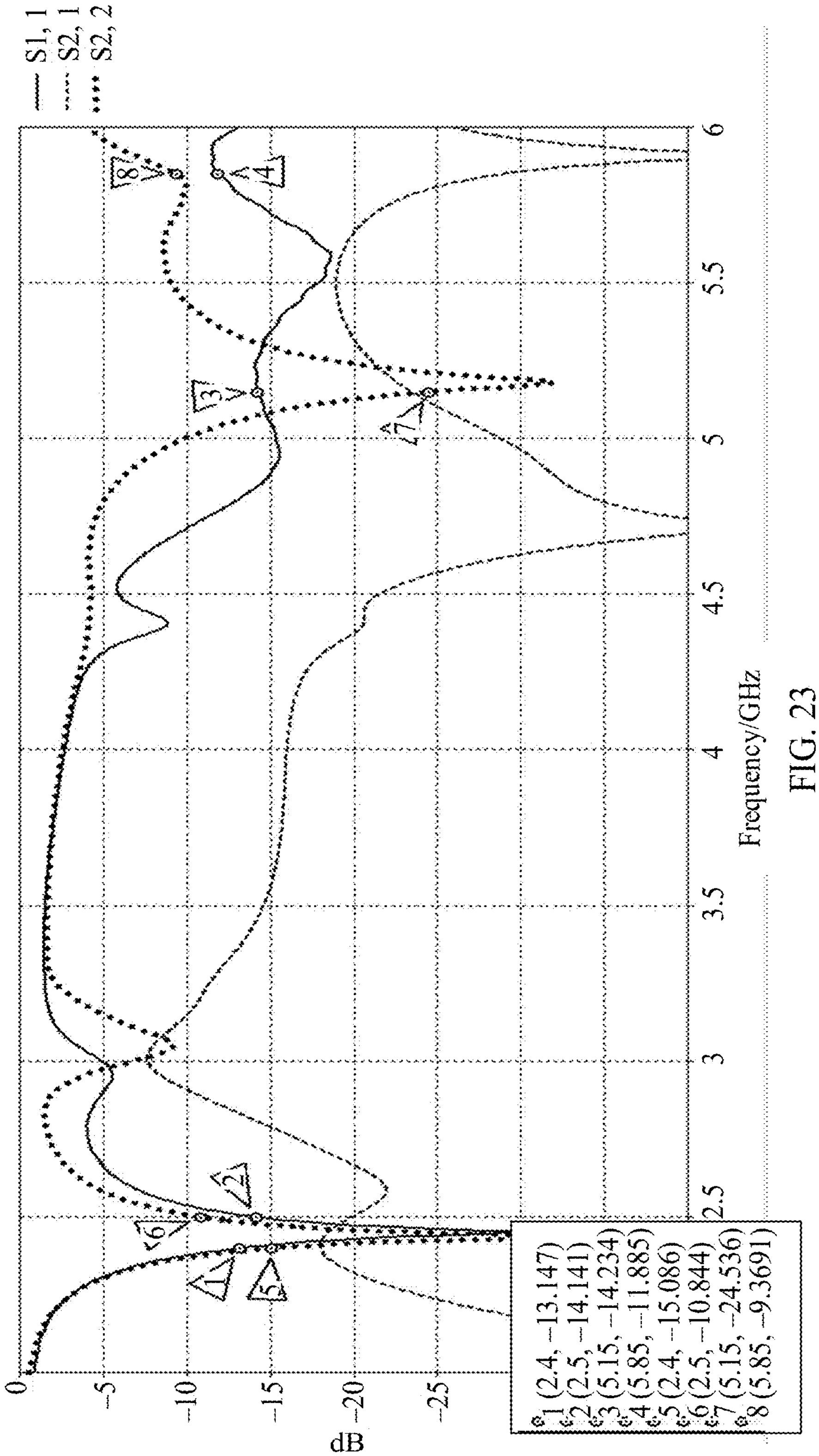
FIG. 23 is a schematic diagram of an S parameter curve of the antenna assembly in FIG. 4 to FIG. 11.

The following describes an effect of the foregoing antenna assembly structure through a simulation result. As shown in FIG. 12 to FIG. 17, FIG. 12 is a schematic diagram of current simulation of the first magnetic dipole antenna in FIG. 4 to FIG. 11 at 2.45 GHz, FIG. 13 is a schematic diagram of current simulation of the first electric dipole antenna in FIG. 4 to FIG. 11 at 5 GHz, FIG. 14 is a schematic diagram of current simulation of the first magnetic dipole antenna in FIG. 4 to FIG. 11 at 5.6 GHz, FIG. 15 is a schematic diagram of current simulation of the first electric dipole antenna in FIG. 4 to FIG. 11 at 2.45 GHz, FIG. 16 is a schematic diagram of current simulation of the first electric dipole antenna in FIG. 4 to FIG. 11 at 5.5 GHz. and FIG. 17 is a schematic diagram of current simulation of the first electric dipole antenna in FIG. 4 to FIG. 11 at 6 GHz. In FIG. 12 to FIG. 17, an arrow indicates a current direction, and a symbol "x" indicates a reverse point of the current, that is, the current is reversed at "x". According to the schematic diagrams of current simulation, it can be learned that most current of the first magnetic dipole antenna flows in a horizontal direction, and most current the first electric dipole antenna flows in a vertical direction, that is, vertical polarization of the two antennas is ensured. As shown in FIG. 18 to FIG. 21, FIG. 18 is a directivity diagram of a first magnetic dipole in FIG. 4 to FIG. 11 at 2.45 GHz, FIG. 19 is a directivity diagram of a first magnetic dipole in FIG. 4 to FIG. 11 at 5 GHz, FIG. 20 is a directivity diagram of a first electric dipole in FIG. 4 to FIG. 11 at 2.45 GHz, and FIG. 21 is a directivity diagram of a first electric dipole in FIG. 4 to FIG. 11 at 5 GHz; As shown in FIG. 22 and FIG. 23, FIG. 22 is a combined directivity diagram of the antenna assembly in FIG. 4 to FIG. 11 at 2.4 GHz, and FIG. 23 is a schematic diagram of an S parameter curve of the antenna assembly in FIG. 4 to FIG. 11. In FIG. 22, a solid line and a dotted line are directivity diagram curves of the two antennas. Frequency 1 and frequency 2 are the positions with the maximum distance between the two curves. The difference between the two curves is an imbalance degree of the antenna, which is 3.6 dB. In addition, from the directivity diagram curve of the same antenna in FIG. 22, it can be learned that out-of-roundness of the antenna on a horizontal plane is good, and the out-of-roundness refers to a difference between a maximum value and a minimum value in a horizontal plane direction of the antenna. It can be learned from FIG. 23 that the two antennas can cover 2.4 GHz and 5 GHz dual-band resonance, to implement dual-band coverage.

Figure 24:
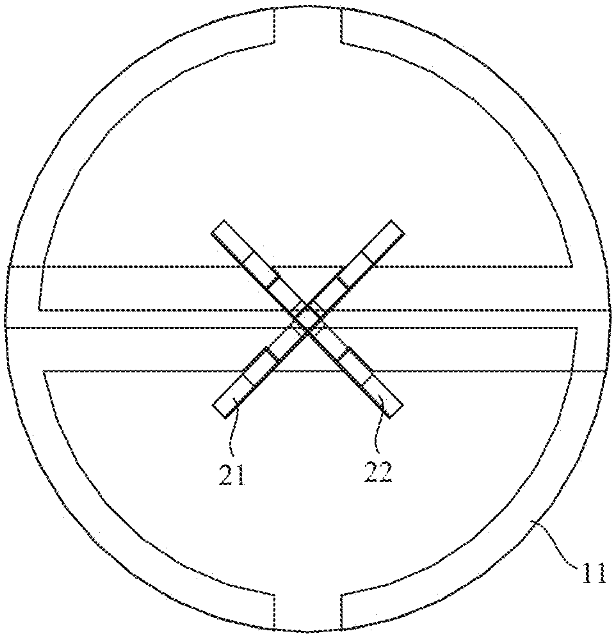
FIG. 24 is a schematic diagram of a structure of another antenna assembly according to an embodiment of this application.
Figure 25:
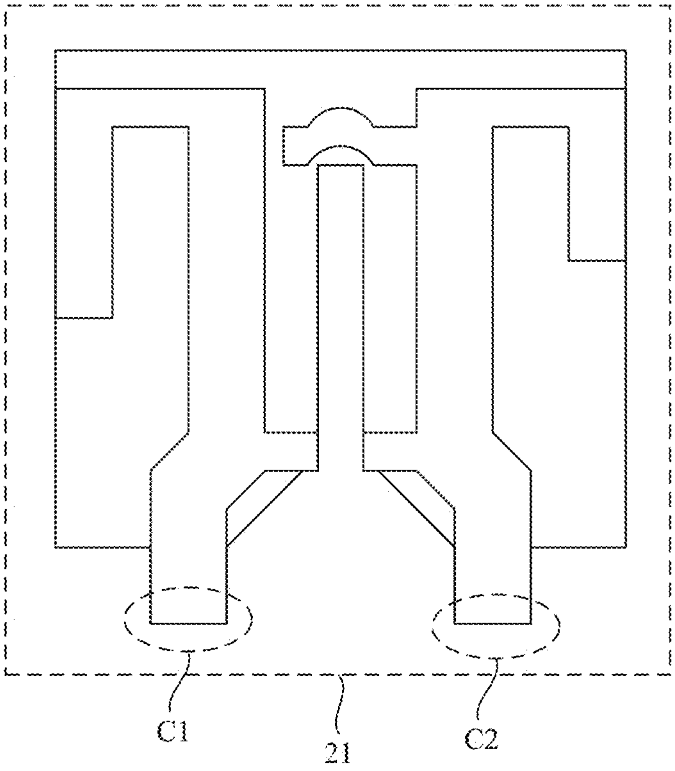
FIG. 25 is a schematic diagram of a structure of a first electric dipole antenna of the antenna assembly in FIG. 24.
Figure 26:
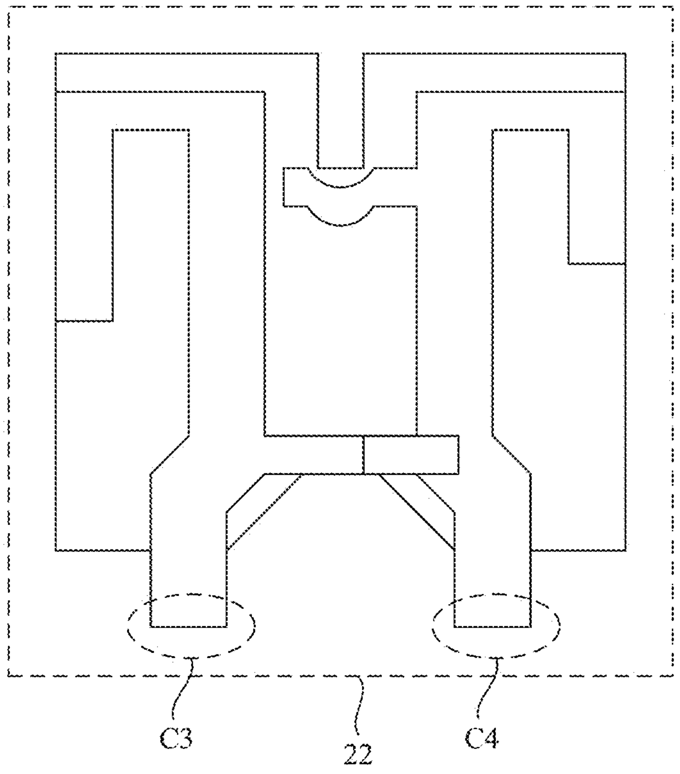
FIG. 26 is a schematic diagram of a structure of a second electric dipole antenna of the antenna assembly in FIG. 24.
Figure 27:
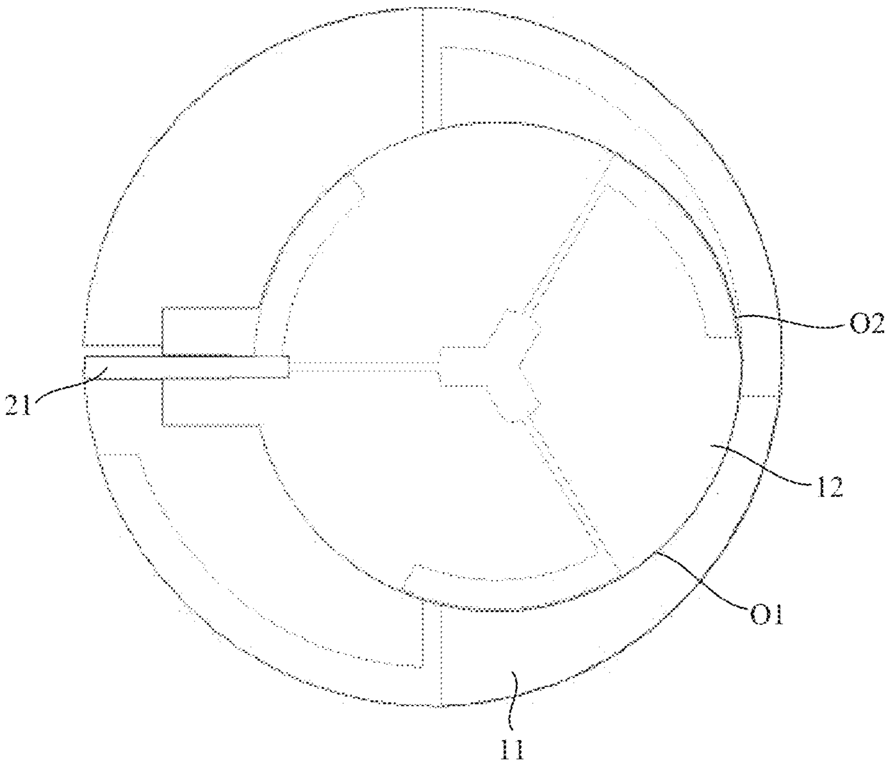
FIG. 27 is a schematic diagram of a structure of another antenna assembly according to an embodiment of this application.
Figure 28:
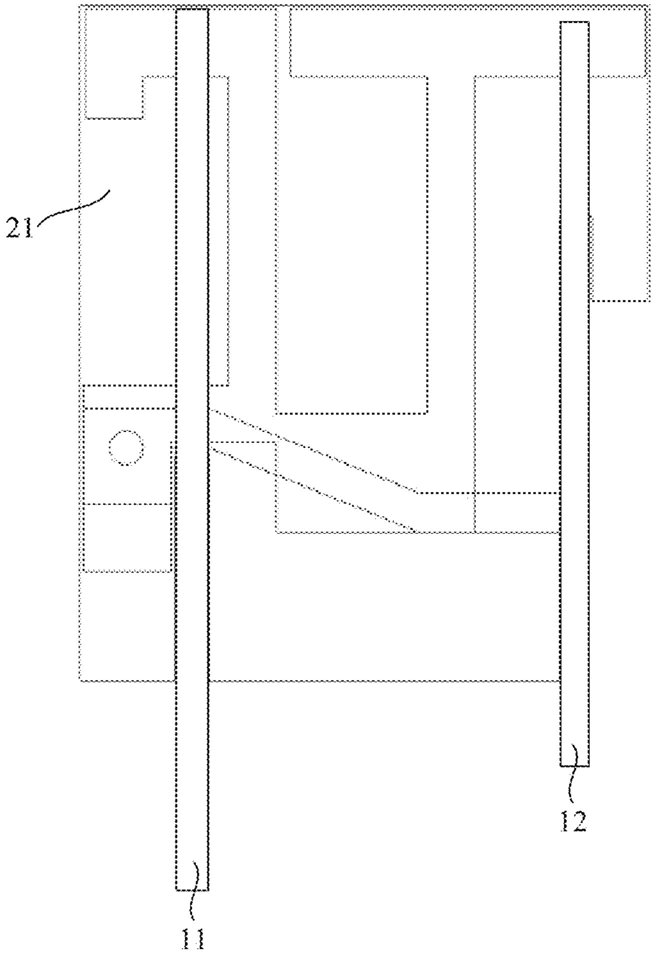
FIG. 28 is a schematic diagram of a structure of the antenna assembly in FIG. 27 at another angle.
Figure 29:
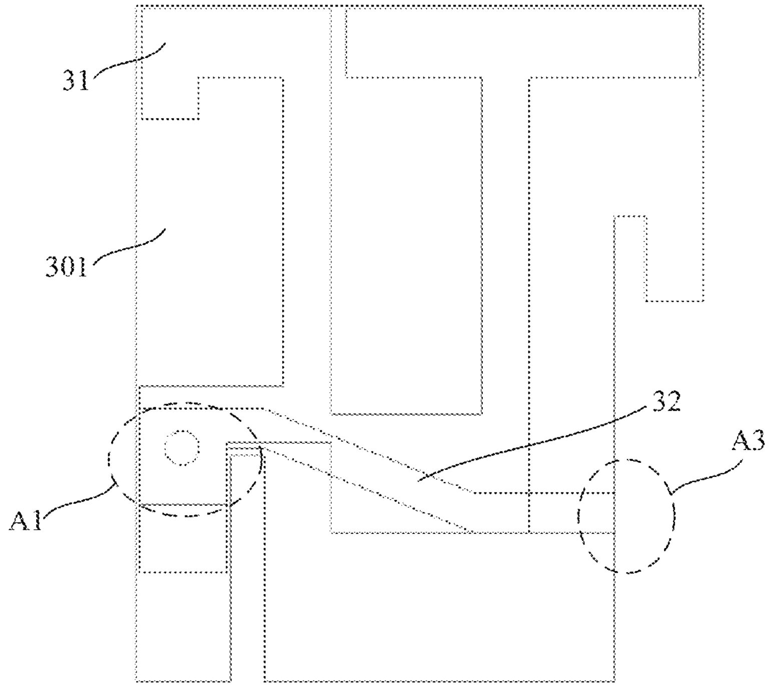
FIG. 29 is a schematic diagram of a structure of a first electric dipole antenna of the antenna assembly in FIG. 27.
Figure 30:
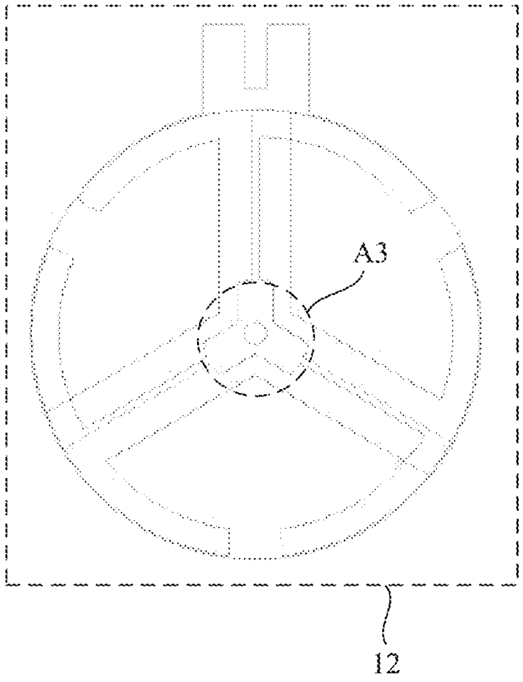
FIG. 30 is a schematic diagram of a structure of a second magnetic dipole antenna of the antenna assembly in FIG. 27.
Figure 31:
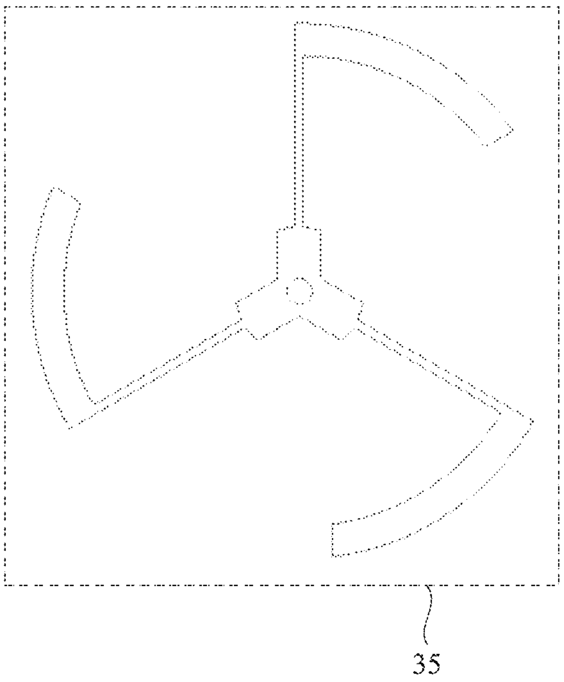
FIG. 31 is a schematic diagram of a structure of a fifth radiator of the second magnetic dipole antenna in FIG. 30.
Figure 32:
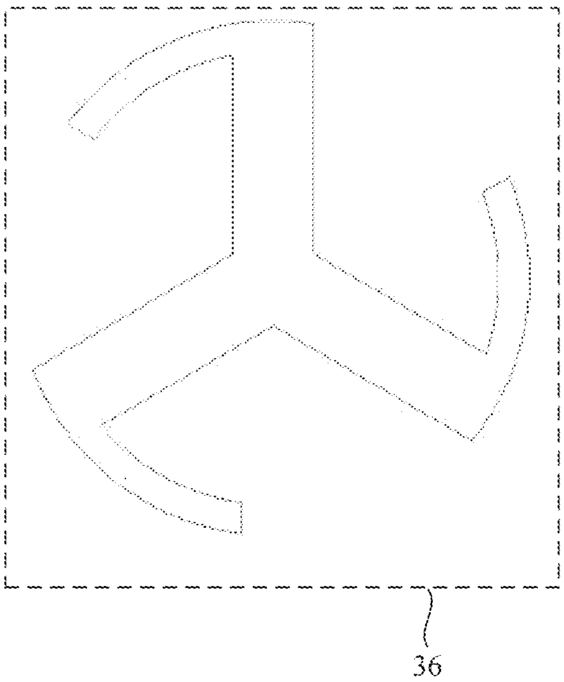
FIG. 32 is a schematic diagram of a structure of a sixth radiator of the second magnetic dipole antenna in FIG. 30.

In a possible implementation, as shown in FIG. 24 to FIG. 26, the antenna assembly further includes: a second electric dipole antenna 22, where the radiator of the first electric dipole antenna 21 is perpendicular to a radiator of the second electric dipole antenna 22. For example, two electric dipole antennas may be placed in a cross manner, and any two of the three antennas are perpendicular to each other when the two electric dipole antennas are placed in a cross manner with the magnetic dipole antenna, to implement high isolation among the three antennas. A specific structure of the first electric dipole antenna 21 may be similar to that in the foregoing embodiment, and a specific structure of the first magnetic dipole antenna 11 may be similar to that in the foregoing embodiment, and details are not described herein again. For example, the first electric dipole antenna 21 in FIG. 25 has a first welding point C1 and a second welding point C2, and the first electric dipole antenna 21 is welded to the first magnetic dipole antenna 11 at the first welding point C1 and the second welding point C2. One of the first welding point C1 and the second welding point C2 is the first feed point, and the first electric dipole antenna 21 and the first magnetic dipole antenna 11 may form a co-ground structure through welding. The second electric dipole antenna 22 in FIG. 26 has a third welding point C3 and a fourth welding point C4, and the second electric dipole antenna 22 is welded to the first magnetic dipole antenna 11 at the third welding point C3 and the fourth welding point C4. One of the third welding point C3 and the fourth welding point C4 is a feed point, and the second electric dipole antenna 22 and the first magnetic dipole antenna 11 may form a co-ground structure through welding.

In a possible implementation, as shown in FIG. 27 to FIG. 31, the radiator of the first magnetic dipole antenna 11 includes a third radiation patch and a fourth radiation patch that are parallel to each other, a second dielectric layer is arranged between the third radiation patch and the fourth radiation patch, and in a direction perpendicular to a plane on which the third radiation patch is located, orthographic projections of edges of the third radiation patch and the fourth radiation patch form at least a part of an edge of a first circle O1. For a specific structure of the first magnetic dipole antenna 11, refer to structures and related descriptions shown in FIG. 8 to FIG. 11. The radiator of the second magnetic dipole antenna 12 includes a fifth radiation patch 35 and a sixth radiation patch 36 that are parallel to each other, a third dielectric layer is arranged between the fifth radiation patch 35 and the sixth radiation patch 36, both the fifth radiation patch 35 and the sixth radiation patch 36 includes an arc extension portion, in a direction perpendicular to the fifth radiation patch 35, orthographic projections of arc extension portions of the fifth radiation patch 35 and the sixth radiation patch 36 form at least a part of an edge of a second circle O2, and a diameter of the second circle O2 is less than a diameter of the first circle O1.

In a possible implementation, as shown in FIG. 27 to FIG. 31, the radiator of the second magnetic dipole antenna 12 has a third feed point A3, and the third feed point A3 is located in a middle part of the second circle O2; and the radiator of the first electric dipole antenna 21 includes a first radiation patch 31 and a second radiation patch 32 parallel to the first radiation patch 31, a first dielectric layer 301 is arranged between the first radiation patch 31 and the second radiation patch 32, the second radiation patch 32 includes a welding portion, the welding portion extends from the first feed point A1 to the third feed point A3, and the second magnetic dipole antenna 12 and the welding portion are welded to the third feed point A3. That is, the first electric dipole antenna 21 and the first magnetic dipole antenna 11 are welded to the first feed point A1 to form a co-ground structure of the two, and the first electric dipole antenna 21 and the second magnetic dipole antenna 12 are welded to the third feed point A3 to form a co-ground structure of the two. A specific structure of the first electric dipole antenna 21 may be the same as or slightly different from the structure in the foregoing embodiment. In structures shown in FIG. 27 to FIG. 31, for example, 5G single-band vertical polarization may be implemented by using the first electric dipole antenna 21 to cover a horizontal plane, and 2.4G single-band horizontal polarization may be implemented by using the first magnetic dipole antenna 11. 5G single-frequency horizontal polarization is implemented by using the second magnetic dipole antenna 12, and the three are designed in a staggered community to achieve high isolation.

An embodiment of this application further provides an electronic device, including the antenna assembly in the foregoing embodiments. A specific structure and principle of the antenna assembly are not described again. The electronic device may be specifically a wireless router or the like.

In embodiments of this application, "at least one" means one or more, and "a plurality of" means two or more. The term "and/or" describes an association relationship between associated objects, and indicates that there may be three relationships. For example, A and/or B may indicate the following cases: There is only A, there are both A and B, and there is only B. A and B may be singular or plural. The character "/" generally indicates an "or" relationship between the associated objects. "At least one of the following items" or a similar expression indicates any combination of these items, including a single item or any combination of a plurality of items. For example, at least one of a, b, and c may indicate: a, b, c, a-b, a-c, b-c, or a-b-c, where a, b, and c may be one or more.

The foregoing descriptions are embodiments of this application, but are not intended to limit this application. For a person skilled in the art, various modifications and variations may be made in this application. Any modification, equivalent replacement, or improvement made without departing from the principle of this application shall fall within the protection scope of this application.

What is claimed is:

1. An antenna assembly, comprising:

a first magnetic dipole antenna comprising a first radiator; and a first electric dipole antenna comprising a second radiator having a second feed point, wherein the first radiator and the second radiator are connected to a first feed point, wherein the first feed point is connected to the second feed point on the second radiator, and wherein the first radiator is perpendicular to the second radiator.

2. The antenna assembly of claim 1, wherein the first feed point comprises a first end and a second end, wherein the second feed point comprises a third end and a fourth end, wherein the second radiator comprises a first radiation patch, and wherein the first radiation patch comprises:

a first stub having the first end of the first feed point;

a second stub having the second end of the first feed point;

a third stub having the third end of the second feed point;

a fourth stub having the fourth end of the second feed point;

a balun structure connected to the second stub, the third stub, and the fourth stub; and a shorted stub connecting the first stub to the balun structure.

3. The antenna assembly of claim 2, wherein the third stub comprises a first strip portion and a second strip portion that are perpendicular to each other, wherein a first tail end of the first strip portion is the third end of the second feed point, wherein a second tail end of the first strip portion is connected to a third tail end of the second strip portion, wherein the fourth stub comprises a third strip portion, a fourth strip portion, and a fifth strip portion, wherein the third strip portion and the first strip portion are in a same straight line, wherein a fourth tail end of the third strip portion is proximate to the first strip portion and is the fourth end of the second feed point, wherein a fifth tail end of the third strip portion is away from the first strip portion and is connected to a sixth tail end of the fourth strip portion, wherein both the fourth strip portion and the fifth strip portion are perpendicular to the third strip portion, wherein the third strip portion is perpendicular to the first radiator, wherein the balun structure comprises a sixth strip portion, a seventh strip portion, and an eighth strip portion that are sequentially connected end to end, wherein a seventh tail end of the sixth strip portion is connected to the third strip portion, wherein an eighth tail end of the sixth strip portion is connected to a ninth tail end of the seventh strip portion, wherein a tenth tail end of the seventh strip portion is connected to an eleventh tail end of the eighth strip portion, wherein a twelfth tail end of the eighth strip portion is connected to the fourth end of the second feed point, wherein the sixth strip portion and the eighth strip portion are perpendicular to the first strip portion, wherein the seventh strip portion is parallel to the first strip portion, wherein the balun structure, the second strip portion, the fourth strip portion, and the fifth strip portion are all on a same side as the first strip portion and the third strip portion, wherein the fifth strip portion and the balun structure are located between the second strip portion and the fourth strip portion, wherein the fifth strip portion is located between the fourth strip portion and the balun structure, and wherein a joint between the seventh strip portion and the eighth strip portion is connected to the first stub using the shorted stub.

4. The antenna assembly of claim 3, wherein the first radiation patch further comprises a fifth stub located between the eighth strip portion and the second strip portion, and wherein the fifth stub is connected to the eighth strip portion.

5. The antenna assembly of claim 3, wherein the second radiator further comprises a second radiation patch parallel to the first radiation patch, and wherein the second radiation patch comprises:

a ninth stub opposite to a part of the first stub and connected to the first end of the first feed point;

a tenth stub opposite to parts of the sixth strip portion and the third strip portion, wherein the tenth stub is arranged floating in the air; and a first dielectric layer disposed between the first radiation patch and the second radiation patch.

6. The antenna assembly of claim 2, wherein the first radiator comprises:

a third radiation patch;

a fourth radiation patch that is parallel to the third radiation patch; and a second dielectric layer disposed between the third radiation patch and the fourth radiation patch, wherein the third radiation patch is connected to the first end of the first feed point of the first stub, and wherein the fourth radiation patch is connected to the second end of the first feed point of the first stub.

7. The antenna assembly of claim 6, wherein the third radiation patch comprises a first straight line extension portion having a first tail end connected to a first arc extension portion and having a second tail end connected to a second arc extension portion, wherein the first arc extension portion and the second arc extension portion are respectively located on two opposite sides of a center of the first straight line extension portion, wherein a middle part of the first straight line extension portion is connected to the first end of the first feed point of the first stub, wherein the fourth radiation patch comprises a second straight line extension portion having a third tail end connected to a third arc extension portion and having a fourth tail end connected to a fourth arc extension portion, wherein the third arc extension portion and the fourth arc extension portion are respectively located on two opposite sides of a center of the second straight line extension portion, wherein a middle part of the second straight line extension portion is connected to the second end of the first feed point of the second stub, wherein an extension direction of the first straight line extension portion is parallel to an extension direction of the second straight line extension portion, wherein in a direction perpendicular to a plane on which the third radiation patch is located, an orthographic projection of the first arc extension portion extends from a first point to a second point, and an orthographic projection of the third arc extension portion extends from the first point to a third point, wherein the second point and the third point are respectively located on two opposite sides of the first straight line extension portion, wherein an orthographic projection of the second arc extension portion extends from a fourth point to a fifth point, wherein an orthographic projection of the fourth arc extension portion extends from the fourth point to a sixth point, wherein the fifth point and the sixth point are respectively located on the two opposite sides of the first straight line extension portion, and wherein the orthographic projections of the first arc extension portion, the second arc extension portion, the third arc extension portion, and the fourth arc extension portion form at least a part of an edge of a first circle.

8. The antenna assembly of claim 1, further comprising a second electric dipole antenna having a third radiator perpendicular to the second radiator.

9. The antenna assembly of claim 1, further comprising a second magnetic dipole antenna having a fourth radiator parallel to the first radiator.

10. The antenna assembly of claim 9, wherein the first radiator comprises:

a third radiation patch;

a fourth radiation patch parallel to the third radiation patch; and a second dielectric layer disposed between the third radiation patch and the fourth radiation patch in a direction perpendicular to a plane on which the third radiation patch is located, wherein orthographic projections of edges of the third radiation patch and the fourth radiation patch form at least a part of an edge of a first circle, wherein the fourth radiator comprises:

a fifth radiation patch;

a sixth radiation patch parallel to the fifth radiation patch; and a third dielectric layer disposed between the fifth radiation patch and the sixth radiation patch, wherein both the fifth radiation patch and the sixth radiation patch comprise arc extension portions in a direction perpendicular to the fifth radiation patch, wherein orthographic projections of the arc extension portions of the fifth radiation patch and the sixth radiation patch form at least a part of an edge of a second circle, and wherein a diameter of the second circle is less than a diameter of the first circle.

11. The antenna assembly of claim 10, wherein the fourth radiator has a third feed point located in a middle part of the second circle, and wherein the second radiator comprises:

a first radiation patch;

a second radiation patch parallel to the first radiation patch, wherein the second radiation patch comprises a connection portion extending from the first feed point to the third feed point, and wherein the second magnetic dipole antenna and the connection portion are welded to the third feed point; and a first dielectric layer disposed between the first radiation patch and the second radiation patch.

12. An electronic apparatus, comprising:

an antenna assembly, comprising:

a first magnetic dipole antenna comprising a first radiator; and a first electric dipole antenna comprising a second radiator having a second feed point, wherein the first radiator and the second radiator are connected to a first feed point, wherein the first feed point is connected to the second feed point on the second radiator, and wherein the first radiator is perpendicular to the second radiator.

13. The electronic apparatus of claim 12, wherein the first feed point comprises a first end and a second end, wherein the second feed point comprises a third end and a fourth end, wherein the second radiator comprises a first radiation patch, and wherein the first radiation patch comprises:

a first stub having the first end of the first feed point;

a second stub having the second end of the first feed point;

a third stub having the third end of the second feed point;

a fourth stub having the fourth end of the second feed point;

a balun structure connected to the second stub, the third stub, and the fourth stub; and a shorted stub connecting the first stub to the balun structure.

14. The electronic apparatus of claim 13, wherein the third stub comprises a first strip portion and a second strip portion that are perpendicular to each other, wherein a first tail end of the first strip portion is the third end of the second feed point, wherein a second tail end of the first strip portion is connected to a third tail end of the second strip portion, wherein the fourth stub comprises a third strip portion, a fourth strip portion, and a fifth strip portion, wherein the third strip portion and the first strip portion are in a same straight line, wherein a fourth tail end of the third strip portion is proximate to the first strip portion and is the fourth end of the second feed point, wherein a fifth tail end of the third strip portion is away from the first strip portion and is connected to a sixth tail end of the fourth strip portion, wherein both the fourth strip portion and the fifth strip portion are perpendicular to the third strip portion, wherein the third strip portion is perpendicular to the first radiator, wherein the balun structure comprises a sixth strip portion, a seventh strip portion, and an eighth strip portion that are sequentially connected end to end, wherein a seventh tail end of the sixth strip portion is connected to the third strip portion, wherein an eighth tail end of the sixth strip portion is connected to a ninth tail end of the seventh strip portion, wherein a tenth tail end of the seventh strip portion is connected to an eleventh tail end of the eighth strip portion, wherein a twelfth tail end of the eighth strip portion is connected to the fourth end of the second feed point, wherein the sixth strip portion and the eighth strip portion are perpendicular to the first strip portion, wherein the seventh strip portion is parallel to the first strip portion, wherein the balun structure, the second strip portion, the fourth strip portion, and the fifth strip portion are all on a same side as the first strip portion and the third strip portion, wherein the fifth strip portion and the balun structure are located between the second strip portion and the fourth strip portion, wherein the fifth strip portion is located between the fourth strip portion and the balun structure, and wherein a joint between the seventh strip portion and the eighth strip portion is connected to the first stub using the shorted stub.

15. The electronic apparatus of claim 14, wherein the first radiation patch further comprises a fifth stub located between the eighth strip portion and the second strip portion, and wherein the fifth stub is connected to the eighth strip portion.

16. The electronic apparatus of claim 14, wherein the second radiator further comprises a second radiation patch parallel to the first radiation patch, and wherein the second radiation patch comprises:

a ninth stub opposite to a part of the first stub and connected to the first end of the first feed point;

a tenth stub opposite to parts of the sixth strip portion and the third strip portion, wherein the tenth stub is arranged floating in the air; and a first dielectric layer disposed between the first radiation patch and the second radiation patch.

17. The electronic apparatus of claim 13, wherein the first radiator comprises:

a third radiation patch;

a fourth radiation patch that is parallel to the third radiation patch; and a second dielectric layer disposed between the third radiation patch and the fourth radiation patch, wherein the third radiation patch is connected to the first end of the first feed point of the first stub, and wherein the fourth radiation patch is connected to the second end of the first feed point of the first stub.

18. The electronic apparatus of claim 17, wherein the third radiation patch comprises a first straight line extension portion having a first tail end connected to a first arc extension portion and having a second tail end connected to a second arc extension portion, wherein the first arc extension portion and the second arc extension portion are respectively located on two opposite sides of a center of the first straight line extension portion, wherein a middle part of the first straight line extension portion is connected to the first end of the first feed point of the first stub, wherein the fourth radiation patch comprises a second straight line extension portion having a third tail end connected to a third arc extension portion and having a fourth tail end connected to a fourth arc extension portion, wherein the third arc extension portion and the fourth arc extension portion are respectively located on two opposite sides of a center of the second straight line extension portion, wherein a middle part of the second straight line extension portion is connected to the second end of the first feed point of the second stub, wherein an extension direction of the first straight line extension portion is parallel to an extension direction of the second straight line extension portion, wherein in a direction perpendicular to a plane on which the third radiation patch is located, an orthographic projection of the first arc extension portion extends from a first point to a second point, and an orthographic projection of the third arc extension portion extends from the first point to a third point, wherein the second point and the third point are respectively located on two opposite sides of the first straight line extension portion, wherein an orthographic projection of the second arc extension portion extends from a fourth point to a fifth point, wherein an orthographic projection of the fourth arc extension portion extends from the fourth point to a sixth point, wherein the fifth point and the sixth point are respectively located on the two opposite sides of the first straight line extension portion, and wherein the orthographic projections of the first arc extension portion, the second arc extension portion, the third arc extension portion, and the fourth arc extension portion form at least a part of an edge of a first circle.

19. The electronic apparatus of claim 12, further comprising a second electric dipole antenna having a third radiator perpendicular to the second radiator.

20. The electronic apparatus of claim 12, further comprising a second magnetic dipole antenna having a fourth radiator parallel to the first radiator.

* * * * *